US012240246B2

(12) United States Patent
Mizutani

(10) Patent No.: US 12,240,246 B2
(45) Date of Patent: Mar. 4, 2025

(54) LIQUID HOLDING MEMBER, CAP, AND CARTRIDGE

(71) Applicant: SEIKO EPSON CORPORATION, Tokyo (JP)

(72) Inventor: Tadahiro Mizutani, Shiori (JP)

(73) Assignee: SEIKO EPSON CORPORATION, Tokyo (JP)

( * ) Notice: Subject to any disclaimer, the term of this patent is extended or adjusted under 35 U.S.C. 154(b) by 163 days.

(21) Appl. No.: 18/191,300

(22) Filed: Mar. 28, 2023

(65) Prior Publication Data

US 2023/0311528 A1 Oct. 5, 2023

(30) Foreign Application Priority Data

Mar. 29, 2022 (JP) ................................ 2022-053040

(51) Int. Cl.
*B41J 2/175* (2006.01)

(52) U.S. Cl.
CPC ......... *B41J 2/1754* (2013.01); *B41J 2/17523* (2013.01)

(58) Field of Classification Search
CPC ........................................................ B41J 2/175
See application file for complete search history.

(56) References Cited

U.S. PATENT DOCUMENTS 9,061,512 B2 6/2015 Nozawa et al.
2009/0322837 A1* 12/2009 Muhl .................... B41J 2/1752 347/86

FOREIGN PATENT DOCUMENTS

EP 2666638 A2 * 11/2013 ............. B41J 2/175
JP 2014-97577 A 5/2014

* cited by examiner

*Primary Examiner* — Scott A Richmond
(74) *Attorney, Agent, or Firm* — Oliff PLC

(57) ABSTRACT

A liquid holding member includes a bottom surface, and a plurality of convex portions projecting from the bottom surface. Each of the convex portions includes a plurality of surfaces. The convex portions are molded integrally with the bottom surface.

8 Claims, 18 Drawing Sheets

LIQUID HOLDING MEMBER, CAP, AND CARTRIDGE

The present application is based on, and claims priority from JP Application Serial Number 2022-053040, filed Mar. 29, 2022, the disclosure of which is hereby incorporated by reference herein in its entirety.

BACKGROUND

1. Technical Field

The present disclosure relates to technologies of a liquid holding member, a cap, and a cartridge.

2. Related Art

JP-A-2014-97577 discloses, as a related art, a technology for forming, on a cap detachably attached to the liquid supply portion of an ink cartridge, a liquid absorbing material for absorbing ink that has leaked from the liquid supply portion. In this technology, the liquid absorbing material is a porous body and is formed by a member separate from the cap body that forms the outer shape of the cap.

Since the liquid absorbing material and the cap body are formed as separate members in the related-art technology, various problems may occur. For example, the assembly of the cap may take a long time and many man-hours may be required. In addition, for example, when a liquid adheres to the liquid absorbing material and the liquid is absorbed by the liquid absorbing material, the liquid absorbing material may not be reusable, even when the liquid absorbing material is washed. Accordingly, a technology for solving various problems that may occur in the cap of the related art is desired.

SUMMARY

1. According to a first aspect of the present disclosure, a liquid holding member is provided. This liquid holding member includes a bottom surface; and a plurality of convex portions projecting from the bottom surface, each of the convex portions including a plurality of surfaces, and the plurality of convex portions are molded integrally with the bottom surface.

2. According to a second aspect of the present disclosure, a liquid holding member is provided. This liquid holding member includes a bottom surface; a plurality of convex portions projecting from the bottom surface, each of the convex portions including a plurality of surfaces; a plurality of first edge portions formed by the bottom surface and the surfaces of the convex portions with ridge lines present therebetween; and a plurality of second edge portions formed by adjacent surfaces of the convex portions with ridge lines present therebetween.

3. According to a third aspect of the present disclosure, a liquid holding member is provided. This liquid holding member includes a bottom surface; and a plurality of convex portions projecting from the bottom surface, each of the convex portions including a plurality of surfaces, in which, when a direction in which the convex portions project orthogonally to the bottom surface is a first direction and two directions that are orthogonal to the first direction and are orthogonal to each other are a second direction and a third direction, a plurality of convex portion sets each including two or more different convex portions of the convex portions are arranged in at least one of the second direction and the third direction.

4. According to a fourth aspect of the present disclosure, a cap is provided. The cap to be detachably attached to a cartridge having a liquid supply portion includes a facing surface that faces the liquid supply portion; and the liquid holding member according to the first aspect, the liquid holding member being disposed on the facing surface.

5. According to a fifth aspect of the present disclosure, a cartridge is provided. This cartridge includes a liquid supply portion having a central axis; a cartridge bottom surface; and the liquid holding member according to the first aspect, in which the cartridge bottom surface has a bottom opening portion through which the liquid supply portion is exposed, and the liquid holding member is formed in at least part of a circumference around the central axis in a position on the cartridge bottom surface, the bottom opening portion being surrounded in the position.

DESCRIPTION OF EXEMPLARY EMBODIMENTS

A. First Embodiment

A-1 Structure of a Printing Device

Figure 1:
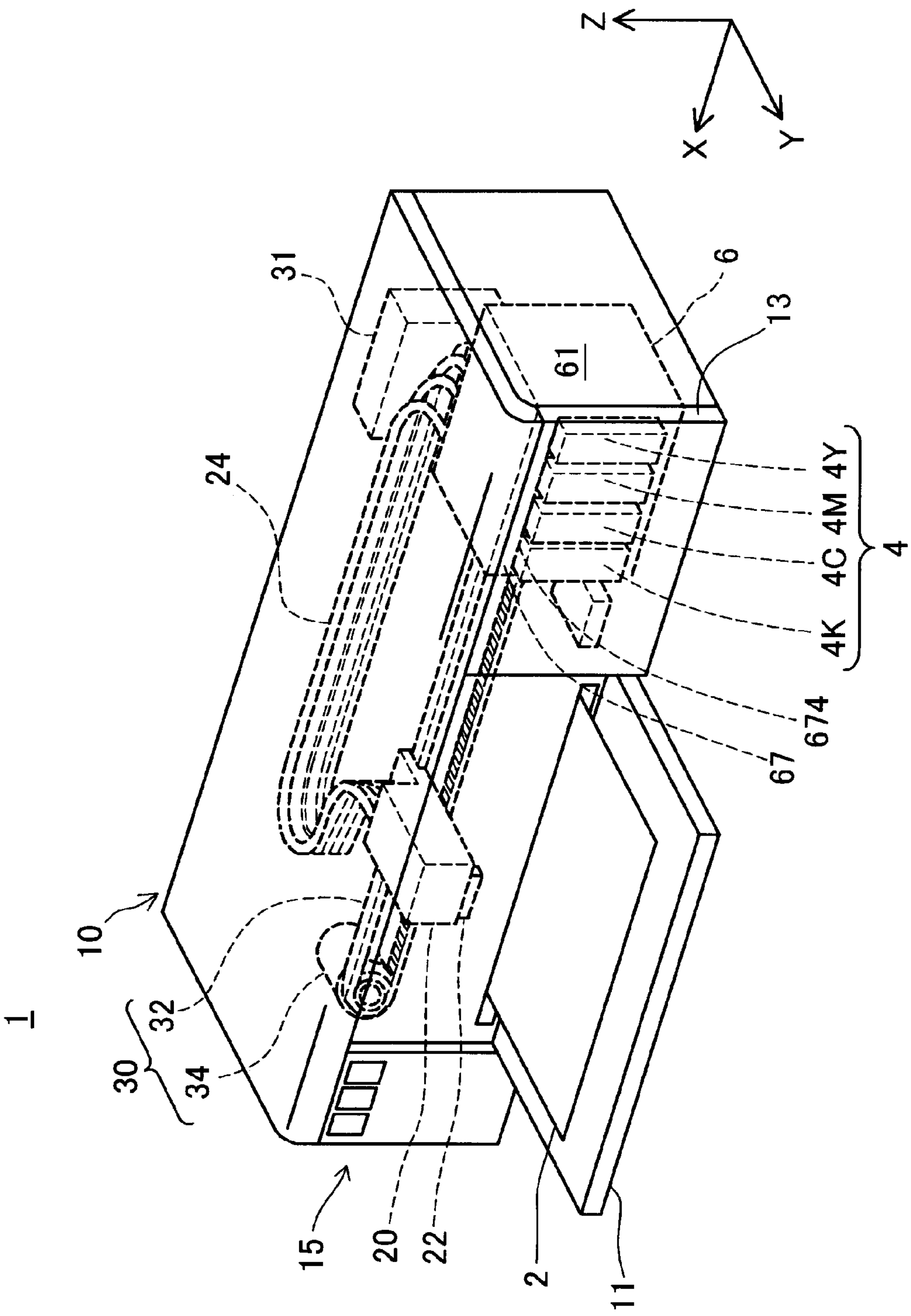
FIG. 1 is a perspective view illustrating the structure of a printing system.

FIG. 1 is a perspective view illustrating the structure of a printing system 1 according to a first embodiment. In FIG. 1, an X-axis, a Y-axis, and a Z-axis that are three spatial axes orthogonal to each other are indicated. The directions of the arrows of the X-axis, the Y-axis, and the Z-axis indicate the positive directions of the X-axis, the Y-axis, and the Z-axis. It is assumed that the positive directions of the X-axis, the Y-axis, and the Z-axis are represented as the +X direction, the +Y direction, and the +Z direction, respectively. The directions opposite to the directions of the arrows of the X-axis, the Y-axis, and the Z-axis are the negative directions of the X-axis, the Y-axis, and the Z-axis. It is assumed that the negative directions of the X-axis, the Y-axis, and the Z-axis are represented as the −X direction, the −Y direction, and the −Z direction, respectively. The directions of the X-axis, the Y-axis, and the Z-axis that have no positive or negative signs are referred to as the X direction, the Y direction, and the Z direction, respectively. This also applies to the drawings and descriptions below.

Figure 8:
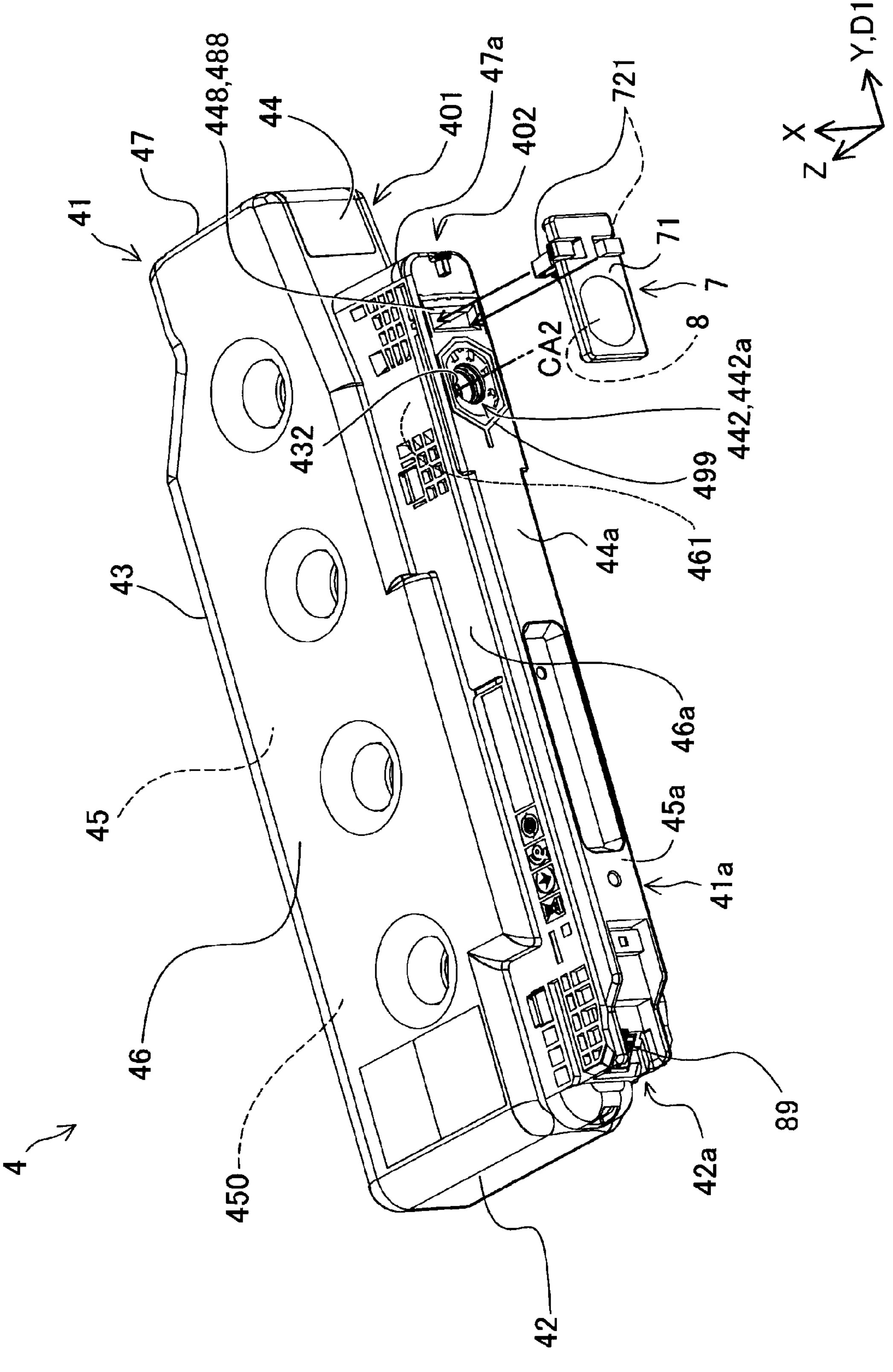
FIG. 8 is a first diagram for describing the schematic structure and the engagement position of a cap.

The printing system 1 includes a printing device 10, a cartridge 4 that supplies a liquid ink to the printer 10, and a cap 7, illustrated in FIG. 8, that is detachably attached to the cartridge 4.

The printing device 10 according to the embodiment is an ink jet printer that ejects a liquid ink from an ejection head 22. This printing device 10 is a large-format printer that performs printing on large A2 to A0 sheets, such as posters. The printing device 10 includes a cartridge installation portion 6, a control portion 31, a carriage 20, the ejection head 22, and a drive mechanism 30. In addition, the printing device 10 has an operation button 15 operated by the user to control the operation of the printing device 10.

The cartridge installation portion 6 has a first device wall 67 located in the +Y direction. The first device wall 67 has an insertion and removal opening portion 674 which is an opening for the cartridges 4 to be placed in an insertion chamber 61. Through this insertion and removal opening portion 674, the cartridge 4 is inserted into the insertion chamber 61 of the cartridge installation portion 6 or the cartridge 4 is removed from the insertion chamber 61. The plurality of cartridges 4 are detachably attached to the cartridge installation portion 6. In the embodiment, four types of cartridges 4 that correspond to the four colors of inks including black, yellow, magenta, and cyan, that is, a total of four cartridges 4 are attached to the cartridge installation portion 6. The cartridge 4 containing a black ink is also referred to as a cartridge 4K, and the cartridge 4 containing a yellow ink is also referred to as a cartridge 4Y. In addition, the cartridge 4 containing a magenta ink is also referred to as a cartridge 4M, and the cartridge 4 containing a cyan ink is also referred to as a cartridge 4C.

The printing device 10 has a replacement cover 13 on the front surface located in the +Y direction. The replacement cover 13 is formed in an openable and closable manner. When the replacement cover 13 is opened, the opening of the cartridge installation portion 6 is exposed to enable the cartridges 4 to be attached and detached. When the cartridges 4 are attached to the cartridge installation portion 6, the inks can be supplied to the ejection head 22 provided in the carriages 20 via tubes 24 as liquid distribution pipes. The tube 24 is provided for each ink type. In the embodiment, a head difference enables the inks to be supplied from the cartridges 4 to the ejection head 22. Specifically, the inks are supplied to the ejection head 22 due to the head difference between the ink levels in the cartridge installation portion 6 and the ejection head 22. It should be noted that, in another embodiment, the inks may be supplied to the ejection head 22 by a pump mechanism, which is not illustrated, of the printing device 10 sucking the inks in the cartridges 4.

The ejection head 22 has nozzles for individual ink types. The ejection head 22 prints data such as characters and images by ejecting the inks onto the printing sheet 2 through the nozzles. In the embodiment, the printing device 10 is a so-called off-carriage-type printer, in which the cartridge installation portion 6 functions independently of the carriage 20. In contrast, the technology according to an aspect of the present disclosure is also applicable to a so-called on-carriage-type printer in which the cartridge installation portion 6 is provided in the carriage 20 and moves together with the carriages 20.

The control portion 31 controls individual portions of the printing device 10 and exchanges signals with the cartridge 4. The carriage 20 moves the ejection head 22 relative to the printing sheet 2.

The drive mechanism 30 reciprocates the carriage 20 based on a control signal from the control portion 31. The drive mechanism 30 includes a timing belt 32 and a drive motor 34. The drive mechanism 30 reciprocates the carriage 20 in the main scanning direction, which is the X direction, by transmitting the power of the drive motor 34 to the carriage 20 via the timing belt 32. In addition, the printing device 10 has a transport mechanism for moving the printing sheet 2 in the sub-scanning direction, which is the +Y direction. When printing is performed, the printing sheet 2 is moved in the sub-scanning direction by the transport mechanism, and after printing, the printing sheet 2 is output onto the front cover 11.

In the embodiment, in a use state of the printing system 1, it is assumed that the axis extending in the sub-scanning direction in which the printing sheet 2 is transported is the Y-axis, the axis extending in the direction of gravity is the Z-axis, and the axis extending in the direction in which the carriage 20 moves is the X-axis. Here, "use state of the printing system 1" refers to a state in which the printing system 1 is installed on a horizontal surface. In addition, in the embodiment, it is assumed that the sub-scanning direction is the +Y direction, the direction opposite to the +Y direction is the −Y direction, the direction of gravity is the −Z direction, and the direction opposite to the direction of gravity is the +Z direction. The X direction and the Y direction extend horizontally. In addition, it is assumed that, when the printing system 1 is viewed from the front side, the direction from the right side to the left side is the +X direction and the direction opposite to the +X direction is the −X direction. In addition, in the embodiment, it is assumed that an insertion direction D1 in which the cartridges 4 are inserted into the cartridge installation portion 6 for attachment is the −Y direction and a removal direction D4 in which the cartridges 4 are removed from the cartridge installation portion 6 for removal is the +Y direction. Accordingly, the −Y direction side of the cartridge installation portion 6 is also referred to as a back side, and the +Y direction side is also referred to as a front side. In addition, in the embodiment, the arrangement direction in which the plurality of cartridges 4 are arranged is the X direction.

A-2 Detailed Structure of the Cartridge Installation Portion

Figure 2:
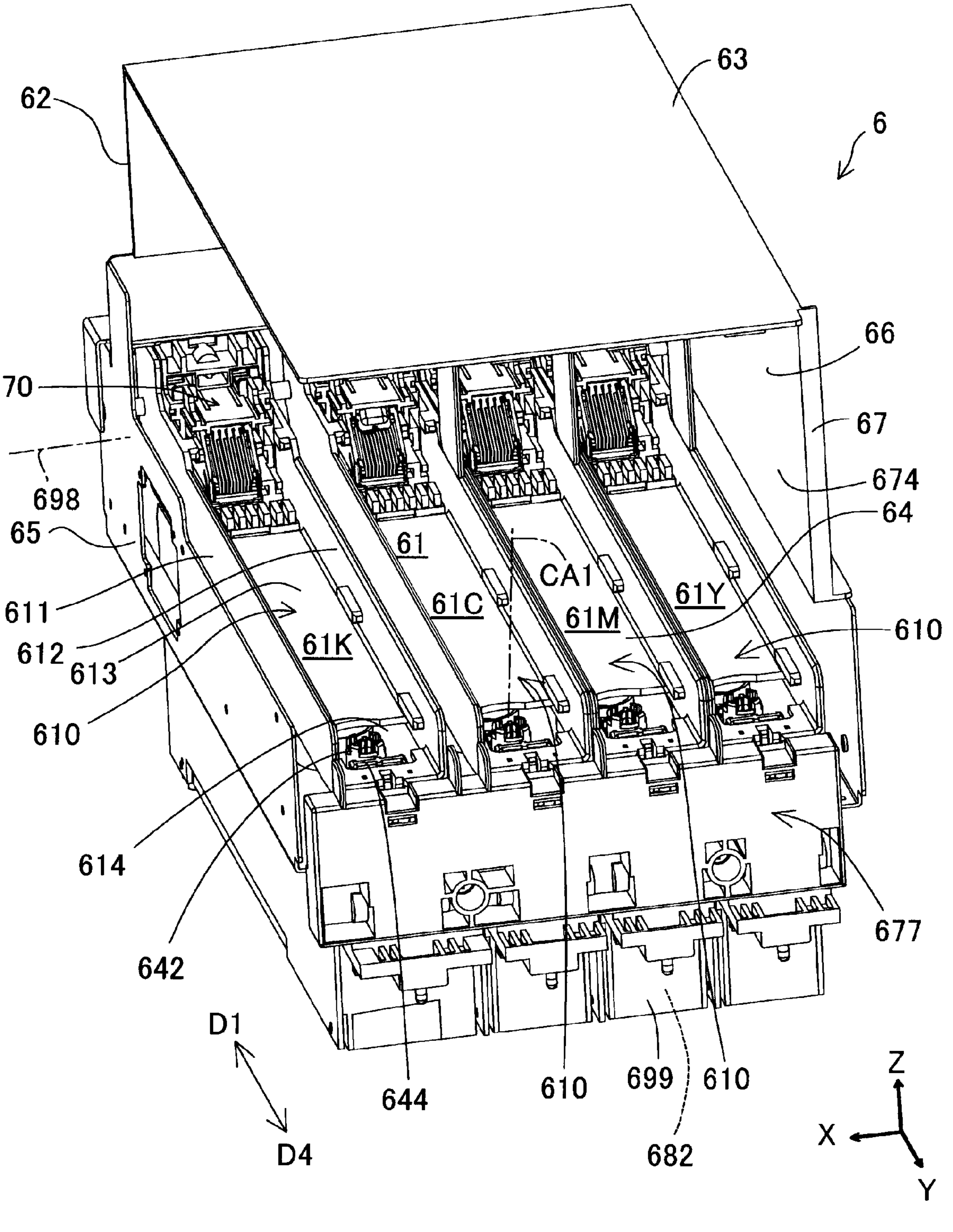
FIG. 2 is a perspective view of a cartridge installation portion.
Figure 3:
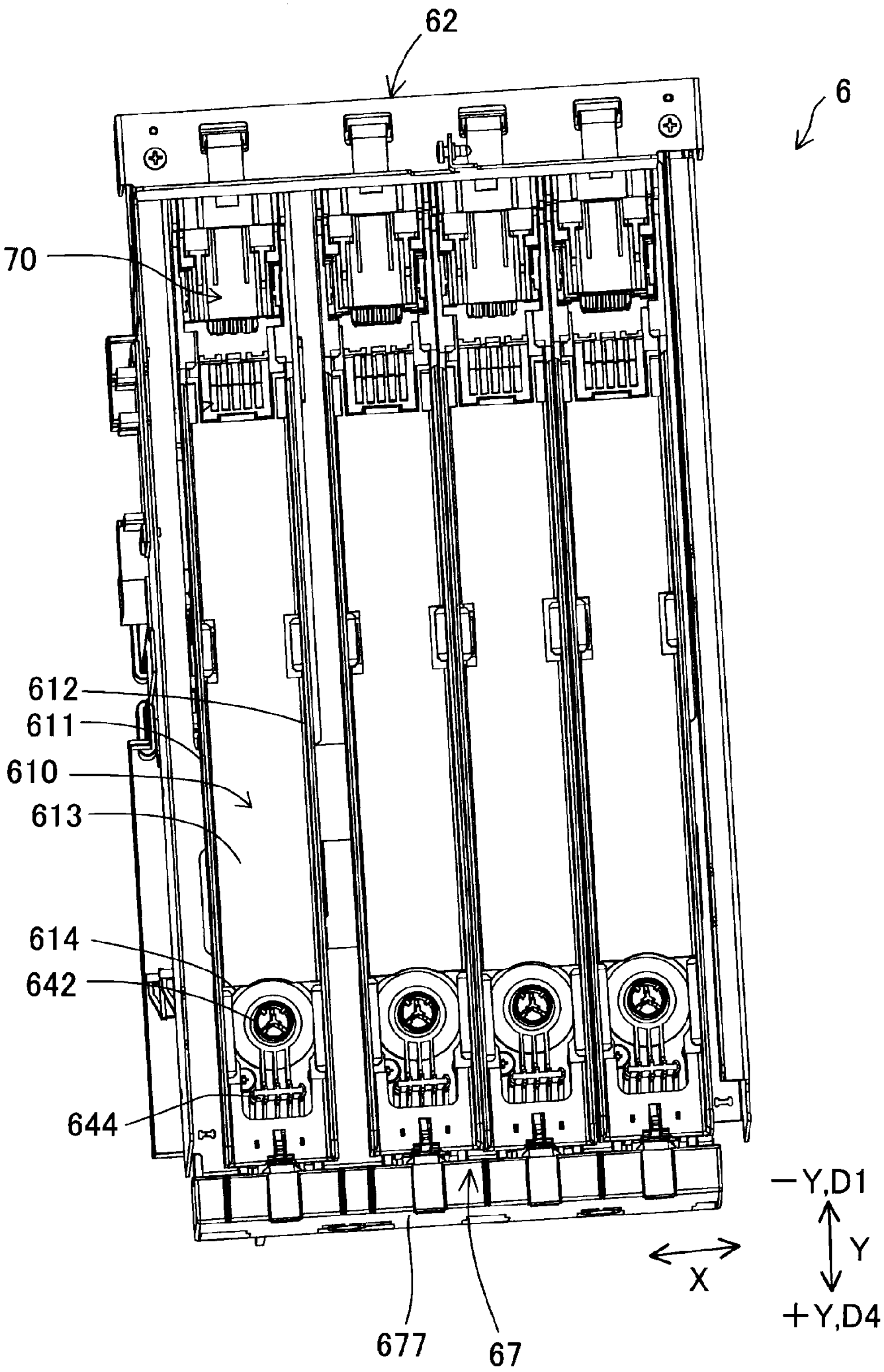
FIG. 3 is a diagram of the cartridge installation portion as viewed in a +Z direction.

FIG. 2 is a perspective view of the cartridge installation portion 6. FIG. 3 is a diagram of the cartridge installation portion 6 as viewed in the +Z direction. In FIGS. 2 and 3, part of the structure of the cartridge installation portion 6 is not illustrated for ease of understanding. Regarding the cartridge installation portion 6, the X direction is also referred to as the width direction, the Y direction is also referred to as the depth direction, and the Z direction is also referred to as the height direction. Regarding state, unless specifically described otherwise, the components will be described by assuming the initial deposition state in which the cartridges 4 are not attached to the cartridge installation portion 6.

As illustrated in FIG. 2, the cartridge installation portion 6 forms the insertion chamber 61 into which the cartridges 4 are inserted. The insertion chamber 61 has a substantially rectangular parallelepiped shape. The shapes of slots 61C, 61M, 61Y, and 61K of the insertion chamber 61 into which the cartridges 4C, 4M, 4Y, and 4K, respectively, are inserted substantially correspond to the external shapes of the cartridges 4C, 4M, 4Y, and 4K illustrated in FIG. 1.

The cartridge installation portion 6 has six device walls 62, 63, 64, 65, 66, and 67 that form the insertion chamber 61. In the present disclosure, "wall" represents a single wall or a wall formed by a plurality of walls. The first device wall 67 forms the insertion and removal opening portion 674 through which the cartridge 4 passes when the cartridge 4 is inserted into or removed from the insertion chamber 61. The second device wall 62 forms a wall of the insertion chamber 61 located in the −Y direction. The second device wall 62 faces the first device wall 67 in the Y direction. The second device wall 62 is a substantially vertical wall extending in the Z direction in the use state of the printing device 10.

The device upper wall 63 forms a wall of the insertion chamber 61 located in the +Z direction. The device bottom wall 64 faces the device upper wall 63 in the Z direction and forms a wall of the insertion chamber 61 located in the −Z direction. The device bottom wall 64 is formed by a support member 610. The device bottom wall 64 has a plurality of device opening portions 614. In the embodiment, four device opening portions 614 that correspond to the slots 61C, 61M, 61Y, and 61K are formed. The device upper wall 63 and the device bottom wall 64 intersect the second device wall 62 and the first device wall 67. In the present disclosure, "cross" and "intersect" denote any of the following states (i) to (iii).

(i) State in which first and second components intersect each other and cross each other actually.

(ii) State in which a first component crosses the second component when the first component is extended.

(iii) State in which the first and second components cross each other when both components are extended.

The first device side wall 65 forms a wall of the insertion chamber 61 located in the +X direction. The second device side wall 66 faces the first device side wall 65 in the X direction and forms a wall of the insertion chamber 61 located in the X direction. The first device side wall 65 and second device side wall 66 intersect the second device wall 62, the first device wall 67, the device upper wall 63, and the device bottom wall 64.

As illustrated in FIGS. 2 and 3, the cartridge installation portion 6 further includes the support members 610, liquid reservoir portions 699, liquid inlet portions 642, supply portion positioning portions 644, device-side terminal portions 70, and an engagement formation body 677.

A plurality of support members 610 are provided in accordance with the number of cartridges 4 to be attached. In the embodiment, four of the support members 610 are provided. The support members 610 form the device bottom wall 64 located in the direction of gravity. The support members 610 support the cartridges 4 from the side in the −Z direction, which is the side in the direction of gravity. The support members 610 are concave members that extend in the Y direction.

Each of the support members 610 includes a main wall 613 that forms the device bottom wall 64, a first support side wall 611, and a second support side wall 612. The main wall 613 forms a concave bottom portion located in the direction of gravity. The device opening portion 614 is formed in the end portion of the main wall 613 close to the first device wall 67. The device opening portion 614 passes through the main wall 613 in the thickness direction of the main wall 613, which is the Z direction. The first support side wall 611 rises in the +Z direction, which is the direction opposite to the direction of gravity, from an end portion of the main wall 613 located in the +X direction. The second support side wall 612 rises in the +Z direction from an end portion of the main wall 613 located in the −X direction. The first support side wall 611 and the second support side wall 612 face each other in the X direction.

The liquid reservoir portions 699 communicate with the liquid inlet portions 642 and communicate with the ejection head 22 via the tubes 24 illustrated in FIG. 1. Each of the liquid reservoir portions 699 has an air inlet, not illustrated, through which air is taken. The liquid inlet portion 642 is a cylindrical member and has an introduction channel 682 through which the liquid circulates internally.

The liquid inlet portion 642 receives the liquid from the cartridge 4. The liquid inlet portion 642 has an inlet-side central axis CA1.

As illustrated in FIG. 2, the device-side supply portion positioning portions 644 are received by the cartridge-side supply portion positioning portions 448, which will be described later, of the cartridge 4 illustrated in FIG. 5 to restrict the movement of the liquid supply portions 442 of the cartridge 4 with respect to the liquid inlet portions 642. The device-side supply portion positioning portions 644 are substantially rectangular parallelepiped projections.

The device-side terminal portions 70 are mechanisms provided to electrically couple the cartridges 4 to the printing device 10 with the cartridges 4 attached to the cartridge installation portion 6. Each of the device-side terminal portions 70 has a device-side terminal in contact with a cartridge-side terminal 89 of the cartridge 4.

The engagement formation body 677 is formed in the +Y direction with respect to the support member 610. In addition, the engagement formation body 677 is located in the −Z direction with respect to the insertion and removal opening portion 674. Although not illustrated, four elastic attachment engagement portions corresponding to the slots 61C to 61K are disposed in the engagement formation body 677.

Figure 4:
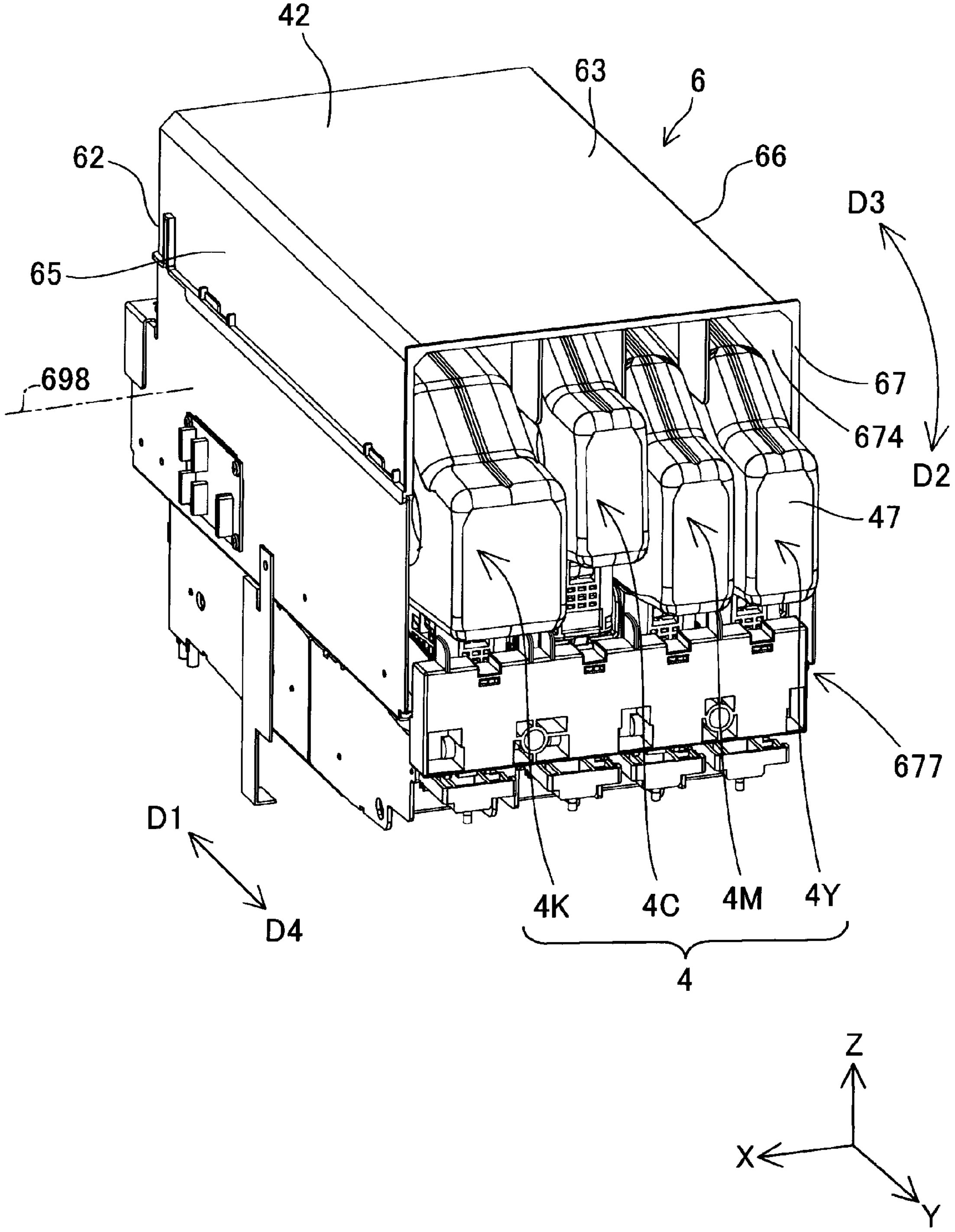
FIG. 4 is a diagram for describing an attachment process of attaching cartridge installation portion.

A-3 Description of an Attachment Process of Attaching the Cartridges to the Cartridge Installation Portion FIG. 4 is a diagram for describing the process of attaching the cartridges 4 to the cartridge installation portion 6. In FIG. 4, the cartridges 4K, 4M, and 4Y among the four types of cartridges 4 are in the so-called insertion complete state in which the cartridges 4K, 4M, and 4Y have been attached to the cartridge installation portion 6. The insertion complete state is the state in which the cartridges 4 have been attached to the cartridge installation portion 6 and the liquid ink can be supplied to the printing device 10. In addition, in FIG. 4, the cartridge 4C is in the insertion complete state in which the cartridge 4C has been inserted into the cartridge installation portion 6. In the insertion complete state, the cartridge 4 has been inserted into the cartridge installation portion 6, but the liquid supply portion 442 of the cartridge 4 is not coupled to the liquid inlet portion 642 of the cartridge installation portion 6.

Figure 5:
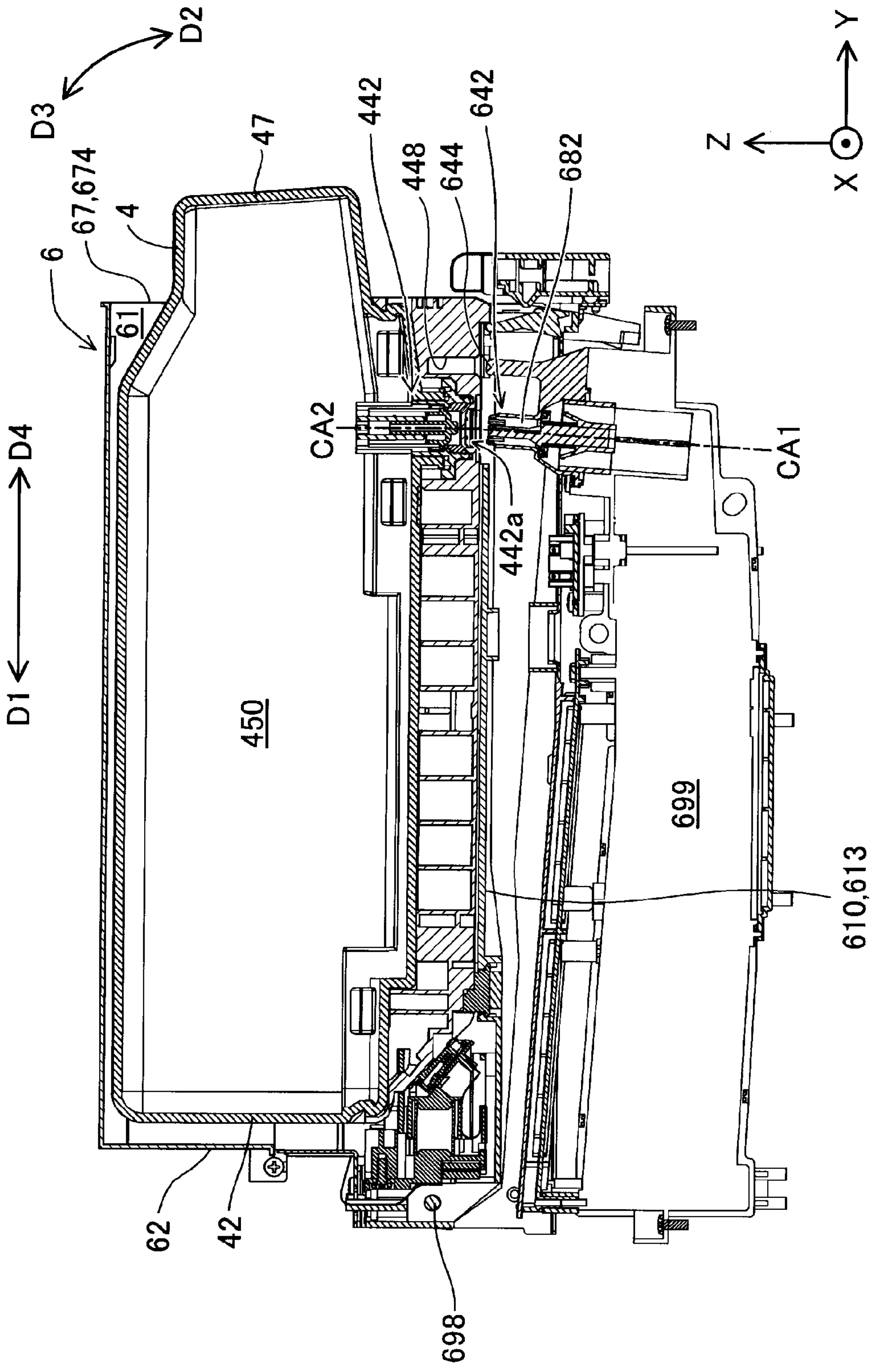
FIG. 5 is a sectional view illustrating the cartridges and the cartridge installation portion in the insertion complete state.
Figure 6:
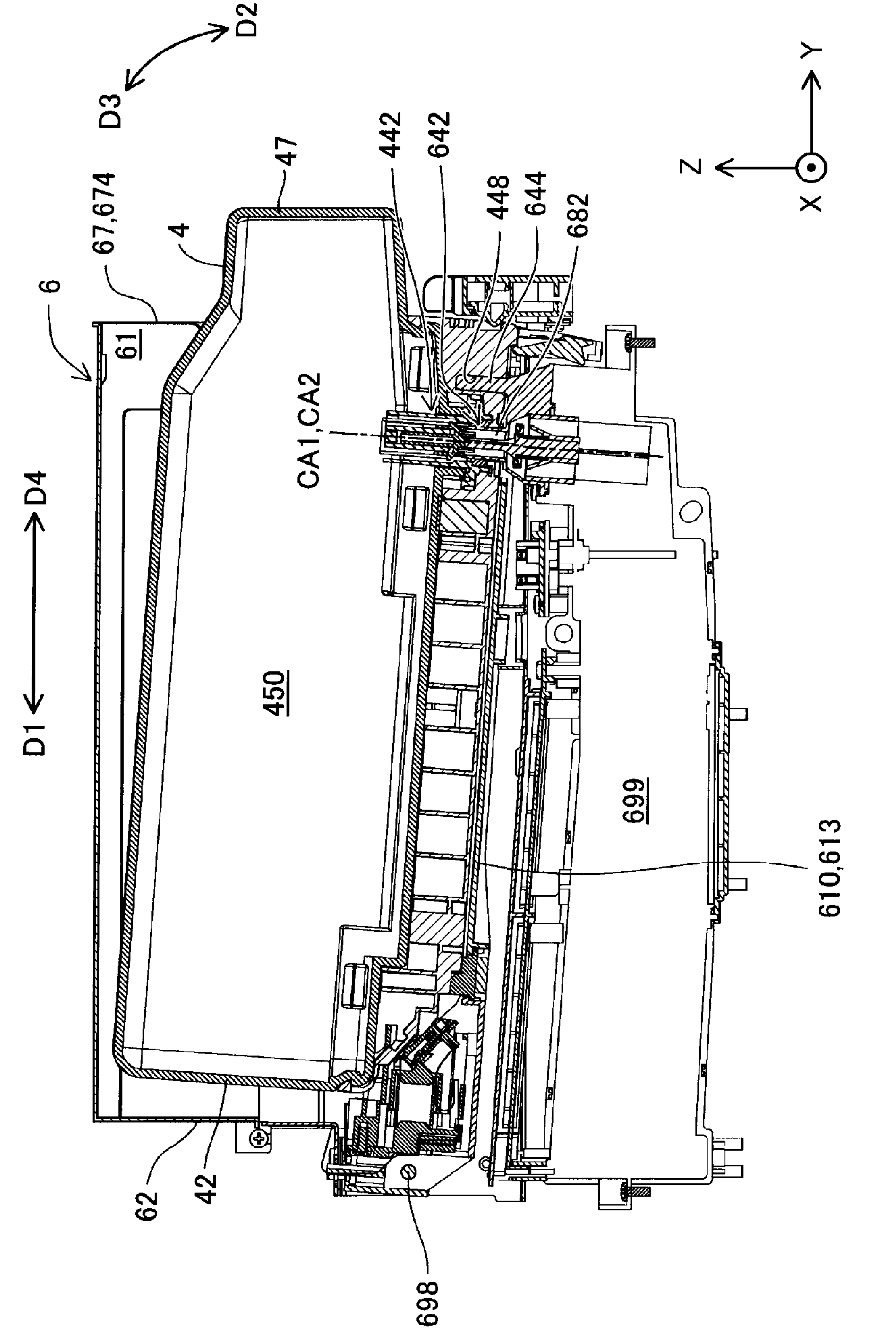
FIG. 6 is a sectional view illustrating the cartridges and the cartridge installation portion in an insertion complete state.

FIG. 5 is a sectional view illustrating the cartridge 4 and the cartridge installation portion 6 in the insertion complete state. FIG. 6 is a sectional view illustrating the cartridge 4 and the cartridge installation portion 6 in the insertion complete state. Both FIGS. 5 and 6 schematically illustrate cross sections taken along a Y-Z plane passing through the inlet-side central axis CA1.

As illustrated in FIGS. 4 and 5, the cartridge 4 moves horizontally in the insertion direction D1 and is inserted into the cartridge installation portion 6 until reaching a predetermined position. Then, as illustrated in FIG. 6, the cartridge 4 moves in the insertion direction D1 while being rotated in a rotational attachment direction D2, which has a component in the direction of gravity, about the back side as a rotation fulcrum 698, thereby completing attachment of the cartridge 4 to the cartridge installation portion 6. Specifically, the attachment process is executed by when the cartridge 4 is attached to the cartridge installation portion 6. The attachment process includes a terminal coupling process and a supply portion coupling process executed after the terminal coupling process.

As illustrated in FIG. 5, the terminal coupling process moves the cartridge 4 horizontally in the insertion direction D1 through the insertion and removal opening portion 674 of the first device wall 67 and inserts the cartridge 4 into the insertion chamber 61 of the cartridge installation portion 6 until the cartridge 4 reaches a predetermined position. At the predetermined position, contact between the cartridge-side terminal of the cartridge 4 completes contact with the device-side terminal 89 of the cartridge installation portion 6.

As illustrated in FIGS. 5 and 6, the supply portion coupling process couples the liquid inlet portion 642 of the cartridge installation portion 6 to the liquid supply portion 442 of the cartridge 4 while keeping contact between the device side terminal and the cartridge-side terminal 89. The detailed structure of the cartridge 4 such as the liquid supply portion 442 will be described later. In the supply unit coupling process, the liquid inlet portion 642 is coupled to the liquid supply portion 442 by rotationally moving, about the rotation fulcrum 698 of the cartridge installation portion 6, the portion of the cartridge 4 close to a rear wall 47 in the rotational attachment direction D2 indicated by the arrow. It should be noted that, in the attachment complete state, as illustrated in FIG. 4, the cartridge 4 is engaged by the engagement formation body 677 close to the first device wall 67 of the cartridge installation portion 6 to keep the attachment complete state.

As illustrated in FIGS. 5 and 6, when the cartridge 4 is removed from the cartridge installation portion 6, the user lifts the portion of the cartridge 4 close to the rear wall 47. This causes the user to move rotationally, about the rotation fulcrum 698 as the fulcrum, the portion of the cartridge 4 close to the front wall 42 located on the opposite side in the Y direction of the portion of the cartridge 4 close to the rear wall 47 in a decoupling direction D3, which is the direction opposite to the rotational attachment direction D2. At the time of this rotational movement, the engagement by the engagement formation body 677 illustrated in FIG. 4 is released. After the cartridge 4 is moved rotationally in the decoupling direction D3 to place the cartridge 4 in the insertion complete state illustrated in FIG. 5, the cartridge 4 can be removed from the cartridge installation portion 6 by moving the cartridge 4 in the +Y direction, which is the removal direction D4.

A-4 Detailed Structure of the Cartridges

Figure 7:
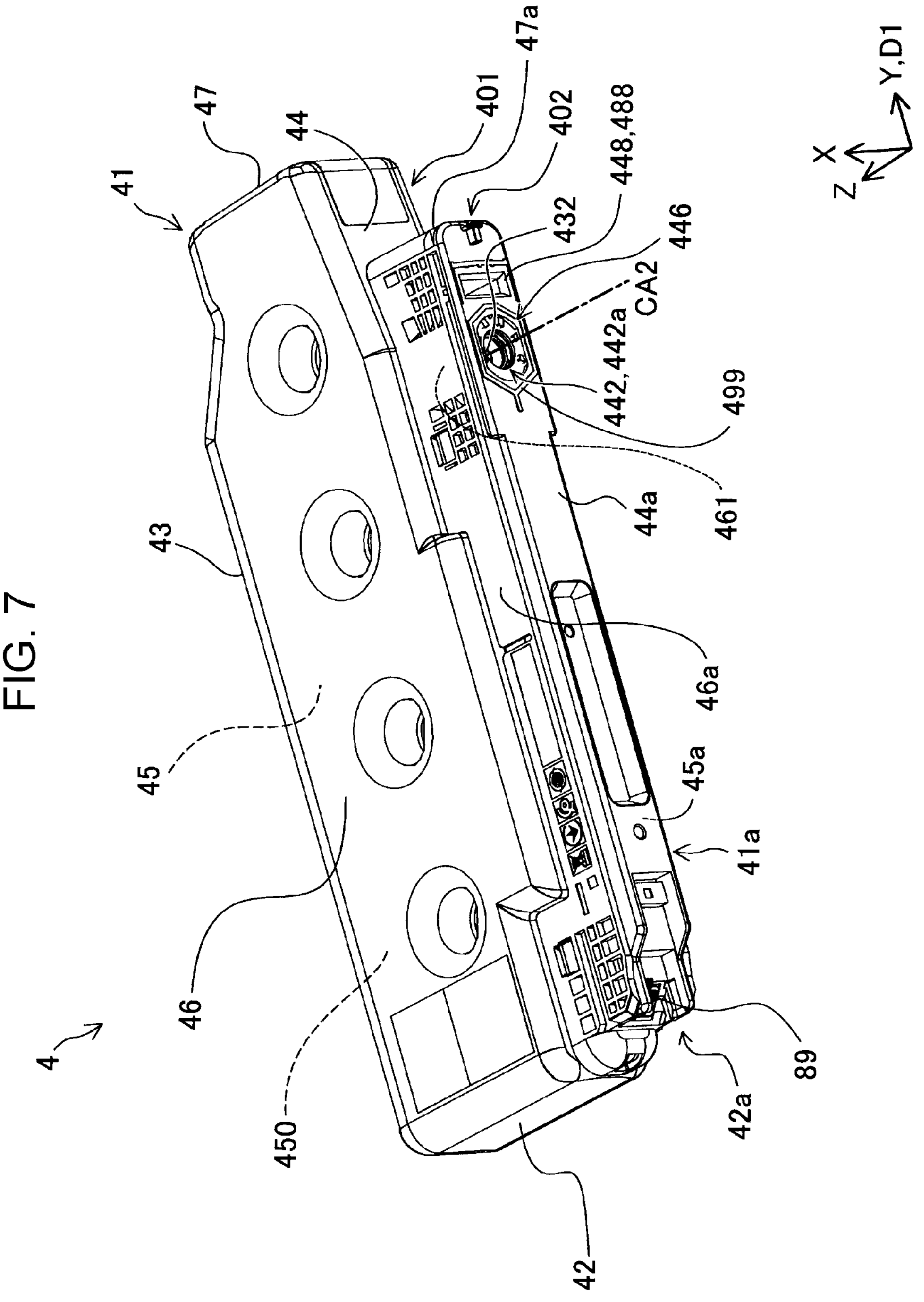
FIG. 7 is a perspective view of the cartridge.

FIG. 7 is a perspective view of the cartridge 4. The outline of the cartridge 4 is a substantially rectangular parallelepiped. Regarding the cartridge 4, the X direction corresponds to the width direction, the Y direction corresponds to the depth direction, and the Z direction corresponds to the height direction. In the following drawings, the X, Y, and Z directions indicated for the cartridges 4 in the drawings assumes the insertion complete state illustrated in FIG. 5. In the embodiment, regarding the outline of the cartridge 4, the dimension in the Y direction is the largest, the dimension in the Z direction is the next largest, and the dimension in the X direction is the smallest. The cartridge 4 includes a liquid container body 401 and an adapter 402. The adapter 402 is attached to the liquid container body 401 by engagement.

The liquid container body 401 includes a body portion 41 that forms the outer shell, a liquid container portion 450, and the liquid supply portion 442. The body portion 41 includes the front wall 42, a rear wall 47, an upper wall 43, a bottom wall 44, a first side wall 45, and a second side wall 46. The front wall 42 and the rear wall 47 face away from each other in the Y direction. The front wall 42 is located in the −Y direction and the rear wall 47 is located in the +Y direction. The upper wall 43 and the bottom wall 44 face away from each other in the Z direction. In the insertion complete state, the upper wall 43 is located in the +Z direction, which is opposite to the position of the liquid inlet portion 642. The bottom wall 44 is located in the −Z direction. The first side wall 45 and the second side wall 46 face away from each other in the X direction. The first side wall 45 is located in the −X direction, and the second side wall 46 is located in the +X direction. The first side wall 45 and the second side wall 46 intersect the front wall 42, the rear wall 47, the upper wall 43, and bottom wall 44.

The liquid container portion 450 is a liquid container that contains the liquid ink. The liquid container portion 450 is formed in the internal space of the liquid container body 401.

As illustrated in FIGS. 5 and 7, the liquid supply portion 442 is a member for supplying the liquid contained in the liquid container portion 450 to the liquid inlet portion 642 of the cartridge installation portion 6. The liquid supply portion 442 has a discharge opening portion 432 through which the liquid contained in the liquid container portion 450 is discharged to the outside. This causes the liquid supply portion 442 to communicate with the liquid container portion 450 via the discharge opening portion 432. The liquid supply portion 442 is a cylindrical member that projects from the bottom wall 44 toward the adapter 402. The liquid supply portion 442 has a supply-portion-side central axis CA2. The supply-portion-side central axis CA2 extends in the direction in which the liquid supply portion 442 extends and, in the embodiment, the supply-portion-side central axis CA2 extends in the Z direction.

The adapter 402 includes an outer shell portion 41*a* that forms a shell, a supply portion disposition chamber 461, a cartridge-side supply portion positioning portion 448, a cartridge-side engagement portion 488, and a bottom opening portion 446.

The outer shell portion 41*a* includes a cartridge front surface 42*a*, a cartridge rear surface 47*a*, a cartridge bottom surface 44*a*, a first cartridge side surface 45*a*, and a second cartridge side surface 46*a*. The cartridge front surface 42*a* and the cartridge rear surface 47*a* face away from each other in the Y direction. In the attachment state in which the adapter 402 is attached to the liquid container body 401, the cartridge front surface 42*a* is located in the −Y direction, which is close to the front wall 42. The cartridge rear surface 47*a* is located in the +Y direction, which is close to the rear wall 47. In the attachment state, the cartridge bottom surface 44*a* faces the bottom wall 44 in the Z direction. The cartridge bottom surface 44*a* is located in the −Z direction and intersects the cartridge front surface 42*a* and the cartridge rear surface 47*a*. The first cartridge side surface 45*a* and the second cartridge side surface 46*a* face each other in the X direction. In the attachment state, the first cartridge side surface 45*a* is located on the side of the first side wall 45, and the second cartridge side surface 46*a* is located on the side of the second side wall 46. The first cartridge side surface 45*a* and the second cartridge side surface 46*a* intersect the cartridge front surface 42*a*, the cartridge rear surface 47*a*, and the cartridge bottom surface 44*a*.

The supply portion disposition chamber 461 is a space provided to house the liquid supply portion 442 in the attachment state. The supply portion disposition chamber 461 is located in the +Y direction, which is the insertion direction D1, in the adapter 402 and formed in the portion surrounded by the cartridge bottom surface 44*a*, the first cartridge side surface 45*a*, and the second cartridge side surface 46*a*.

The cartridge-side supply portion positioning portion 448 is a recess formed in the cartridge bottom surface 44*a*. The cartridge-side engagement portion 488 is an engagement mechanism formed to attach the cap 7 described later to the cartridge 4 when the cartridge 4 is in a pre-insertion state. The so-called pre-insertion state of the cartridge 4 refers to the state in which the cartridge 4 is not yet inserted into or attached to the cartridge installation portion 6. In the embodiment, the cartridge-side engagement portion 488 is formed in the recessed portion as the cartridge-side supply portion positioning portion 448. It should be noted that the formation position and the shape of the cartridge-side engagement portion 488 are not limited to those described above. The cartridge-side engagement portion 488 need only be provided so as to be engageable with cap-side engagement portions 721.

The bottom opening portion 446 exposes the liquid supply portion 442. The bottom opening portion 446 is a hole formed so as to pass through the inner surface and the outer surface of the cartridge bottom surface 44*a*. The bottom opening portion 446 is formed in a portion of the cartridge bottom surface 44*a* in which the supply portion disposition chamber 461 is located. In the embodiment, the bottom opening portion 446 is disposed in a portion of the cartridge bottom surface 44*a* close to the cartridge rear surface 47*a*. In the attachment state, a second end side 442*a* of the liquid supply portion 442 illustrated in FIGS. 5 and 7 is disposed in the bottom opening portion 446. The liquid supply portion 442 is disposed so that the supply-portion-side central axis CA2 passes through the bottom opening portion 446.

In the cartridge bottom surface 44*a*, an outer edge portion 499 is formed in the circumference around the supply-portion-side central axis CA2 so as to surround the bottom opening portion 446. The outer edge portion 499 is formed in a position in which the outer edge portion 499 is exposed to the outside of the cartridge 4.

A-5 Detailed Structure of the Cap

Figure 9:
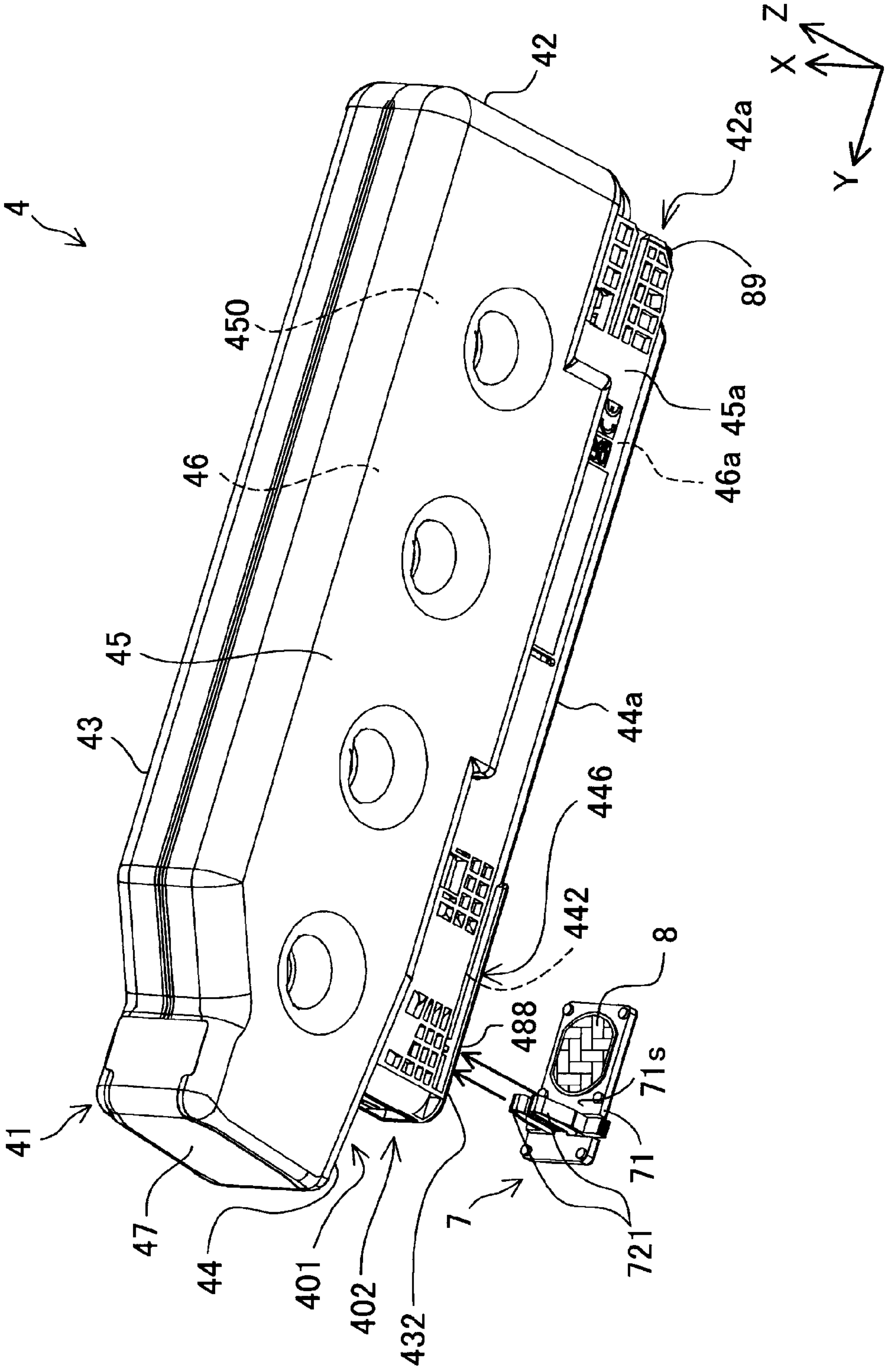
FIG. 9 is a second diagram for describing the schematic structure and the engagement position of a cap.
Figure 10:
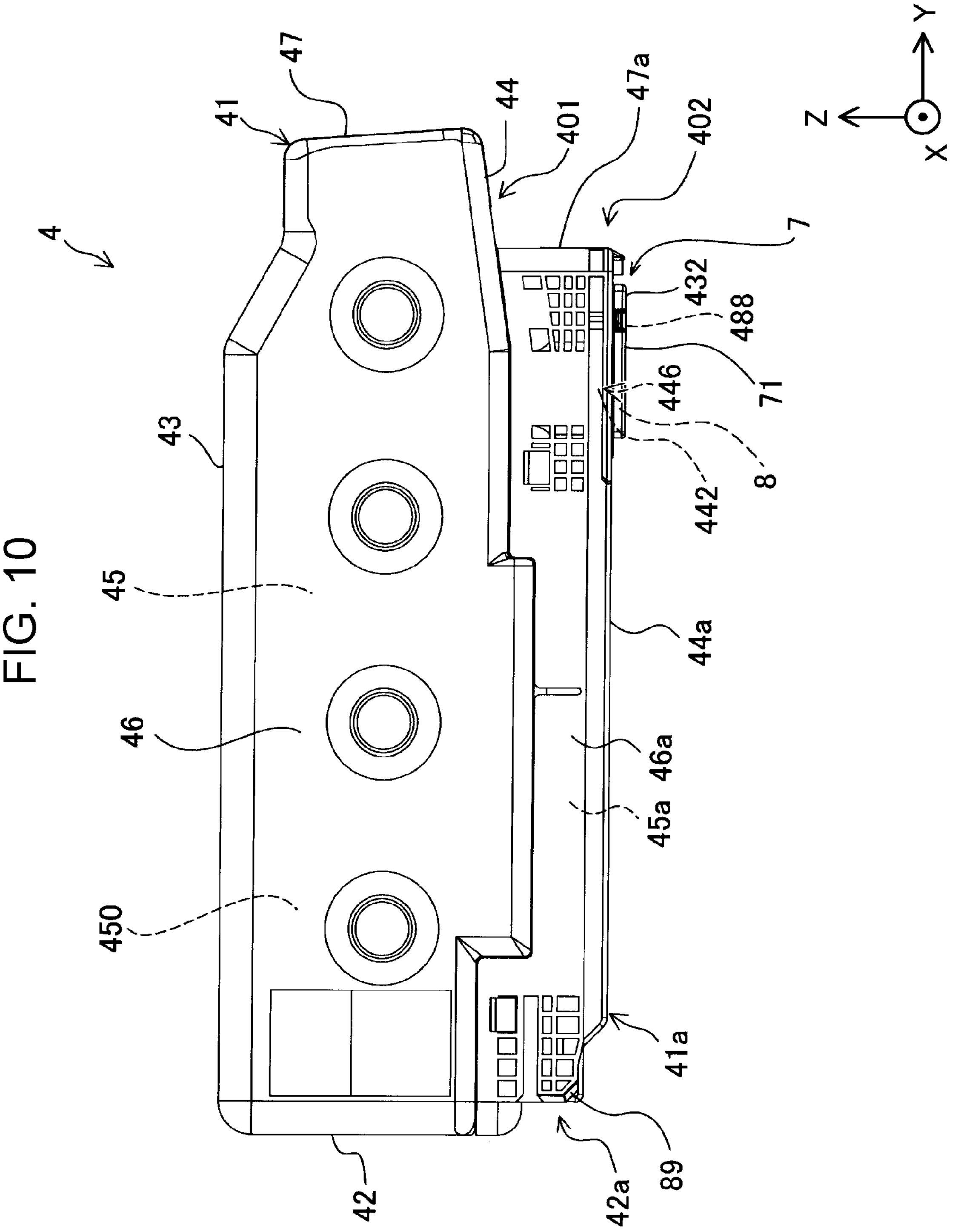
FIG. 10 is a first diagram illustrating the engagement state in which the cap has engaged the cartridge.
Figure 11:
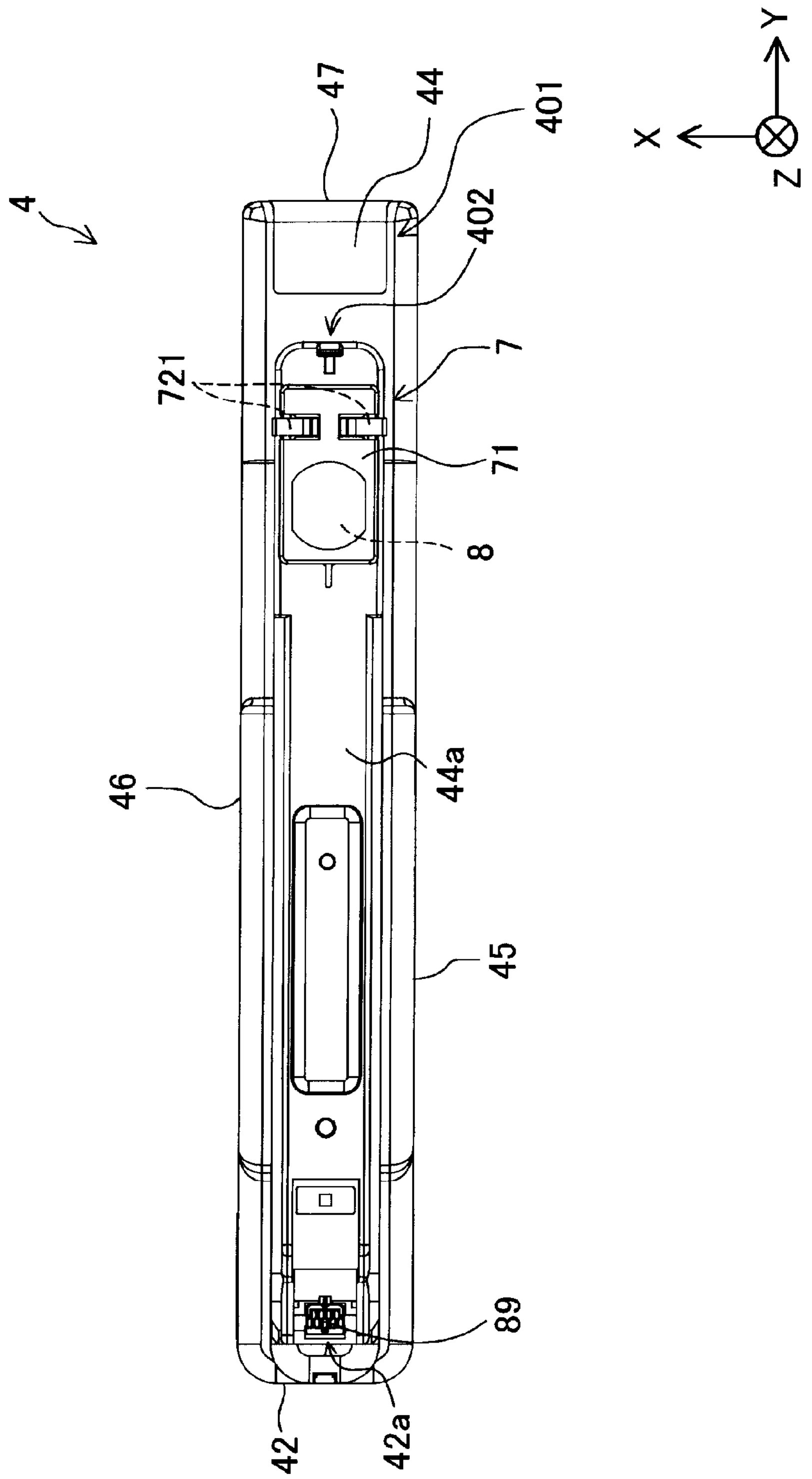
FIG. 11 is a second diagram illustrating the engagement state in which the cap has engaged the cartridge.
Figure 12:
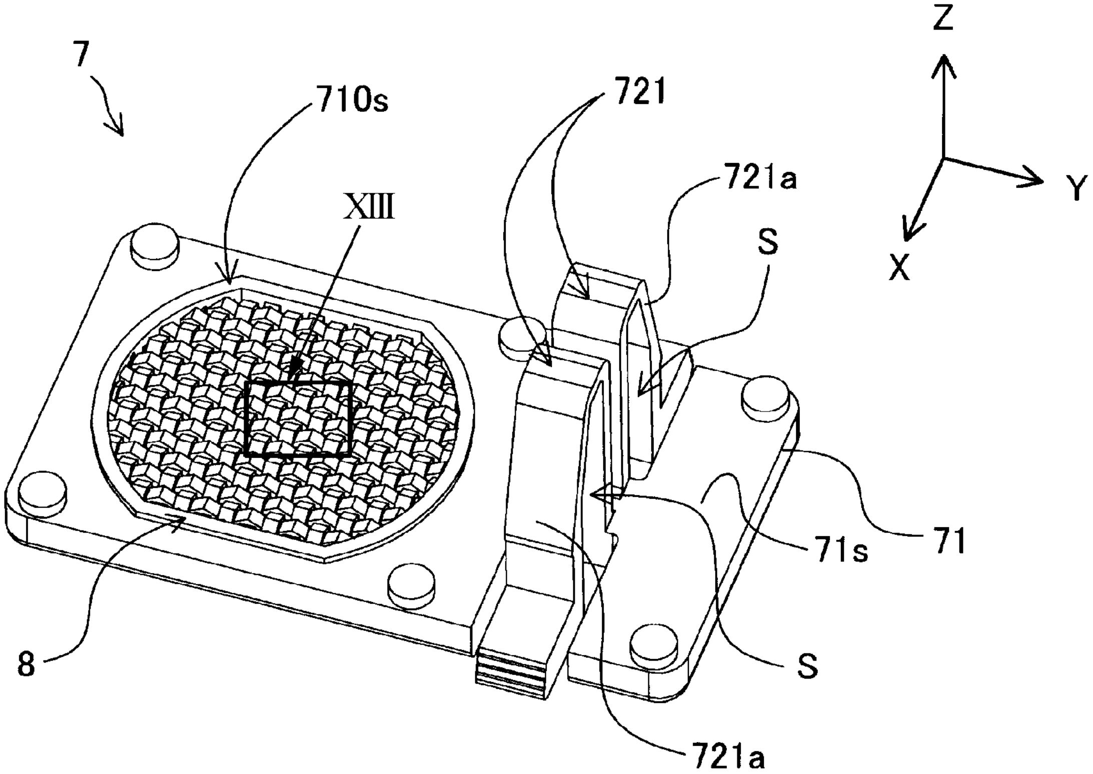
FIG. 12 is a perspective view illustrating of the detailed structure of the cap.

FIG. 8 is a first diagram for describing the schematic structure and the engagement position of the cap 7. FIG. 9 is a second diagram for describing the schematic structure and the engagement position of the cap 7. FIG. 10 is a first diagram for describing the engagement state in which the cap 7 has engaged the cartridge 4. FIG. 11 is a second diagram for describing the engagement state in which the cap 7 has engaged the cartridge 4. FIG. 12 is a perspective view illustrating the detailed structure of the cap 7.

As illustrated in FIG. 9, the X direction, the Y direction, and the Z direction are the lateral direction, the longitudinal direction, and the thickness direction, respectively, of the cap 7. In the following drawings, the X direction, the Y direction, and the Z direction regarding the cap 7, which are indicated in the drawings, are based on the engagement state in which the cap 7 has engaged the cartridge 4 as illustrated in FIGS. 10 and 11.

The cap 7 is a member detachably attached to the cartridge 4 having the liquid supply portion 442. The cap 7 covers the liquid supply portion 442 and at least part of the periphery of the liquid supply portion 442 in the pre-insertion state in which the cartridge 4 is not yet inserted into the cartridge installation portion 6. Accordingly, the cap 7 protects the liquid supply portion 442 and, when the liquid contained in the liquid container portion 450 leaks from the cartridge 442, prevents the liquid from leaking to the outside of the cap 7 and the cartridge 4. As illustrated in FIG. 12, the cap 7 includes a cap body portion 71, a cap-side engagement portions 721, and a liquid holding member 8.

As illustrated in FIGS. 10 and 11, the cap body portion 71 is a substantially plate-like member formed parallel to the cartridge bottom surface 44*a* in the engagement state. That is, the cap body portion 71 is formed to extend in the X direction and the Y direction. The cap body portion 71 has a thickness in the Z direction. The cap body portion 71 is formed of a synthetic resin, such as polypropylene.

As illustrated in FIG. 9, the cap body portion 71 has a facing surface 71*s* that faces the liquid supply portion 442 in the engagement state. As illustrated in FIG. 12, the facing surface 71*s* has a recessed portion 710*s* in which the liquid holding member 8 is disposed.

The cap-side engagement portions 721 are engagement mechanisms formed to attach the cap 7 to the cartridge 4 in the pre-insertion state of the cartridge 4. As illustrated in FIGS. 8 and 9, the cap-side engagement portions 721 engage the cartridge-side engagement portion 488 of the cartridge 4. In FIGS. 8 and 9, the engagement positions between the cartridge-side engagement portion 488 and the cap-side engagement portions 721 are indicated by arrows.

In the embodiment, the cap-side engagement portions 721 are projections that project from the facing surface 71*s* as illustrated in FIG. 12. Specifically, the cap-side engagement portions 721 are pinch-type projections having slope portions 721*a* and a space S illustrated in FIG. 12 such that the cap-side engagement portions 721 can be bent when press-fitted to the cartridge-side engagement portion 488 illustrated in FIG. 8. In addition, in the embodiment, the two cap-side engagement portions 721 are formed so as to project in the Z direction with respect to the cap body portion 71. The two cap-side engagement portions 721 are symmetrical with each other with respect to the axial line extending in the Y direction. Both the two cap-side engagement portions 721 are formed in the +Y direction, which is opposite to the position of the liquid holding member 8 on the facing surface 71*s*.

The cap 7 according to the embodiment is attached to the cartridge 4 as described below. Specifically, as illustrated in FIGS. 8 and 9, in the state in which the facing surface 71*s* is disposed substantially parallel to the cartridge bottom surface 44*a*, the cap-side engagement portions 721 are press-fitted in the direction indicated by the arrows with the cap-side engagement portions 721 facing the cartridge-side engagement portion 488. This causes the cap-side engagement portion 721 to engage the cartridge-side engagement portion 488, thereby attaching the cap 7 to the cartridge 4.

It should be noted that the shape and the formation position of the cap-side engagement portion 721 are not limited to those described above. The cap-side engagement portion 721 need only be provided so as to be engageable with the cartridge-side engagement portion 488. In addition, the number of the cap-side engagement portions 721 formed for one cap 7 is not limited to two, and may be one, or three or more. In addition, the method of engagement between the cap-side engagement portions 721 and the cartridge-side engagement portion 488 is not limited to this and may be engaged by a method other than press-fitting.

The cap-side engagement portions 721 are formed of a synthetic resin, such as polypropylene. It should be noted that the material of the cap-side engagement portions 721 and the material of the cap body portion 71 may be different or identical.

The liquid holding member 8 holds the liquid ink. As illustrated in FIG. 12, the liquid holding member 8 is formed integrally with the cap body portion 71 as the formed member. In the embodiment, the liquid holding member 8 is formed in the recessed portion 710*s* in the facing surface 71*s* as a position in which the liquid holding member 8 faces the discharge opening portion 432.

The liquid holding member 8 is formed of a material that can be reused by being washed. The material that can be reused by being washed is a synthetic resin, such as polypropylene. That is, the liquid holding member 8 is formed of a material or a structural body that can be reused more easily by being washed than a porous body formed of a synthetic resin, such as polyvinyl alcohol. It should be noted that the liquid holding member 8 may be made of the same material as the cap body portion 71 or may be made of a different material. Since the liquid holding member 8 is molded integrally with the cap body portion 71 at this time, the liquid holding member 8 may be formed of a material that is easily molded integrally with the cap body portion 71 in a manufacturing process.

Figure 13:
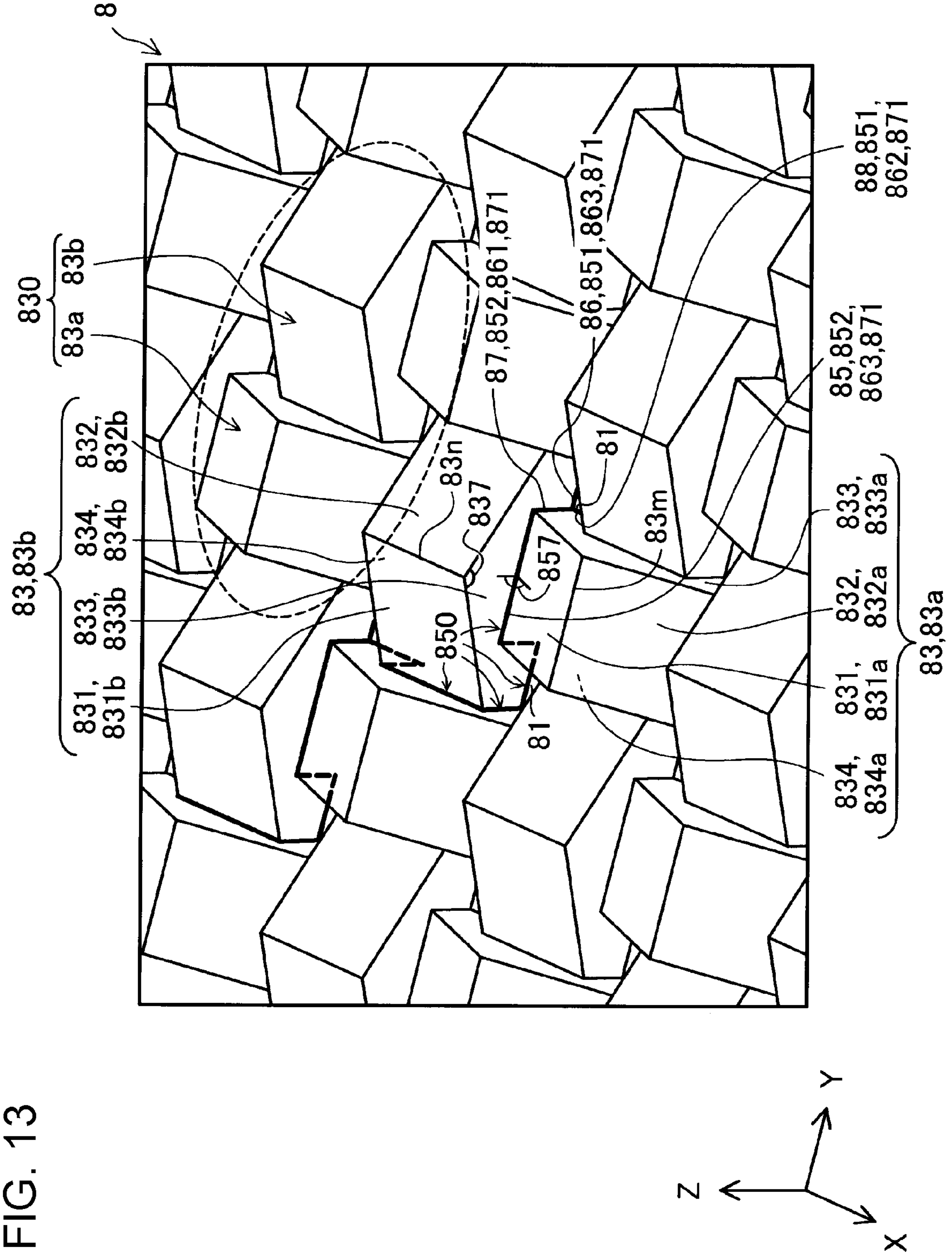
FIG. 13 is an enlarged view of a region in FIG. 12.
Figure 14:
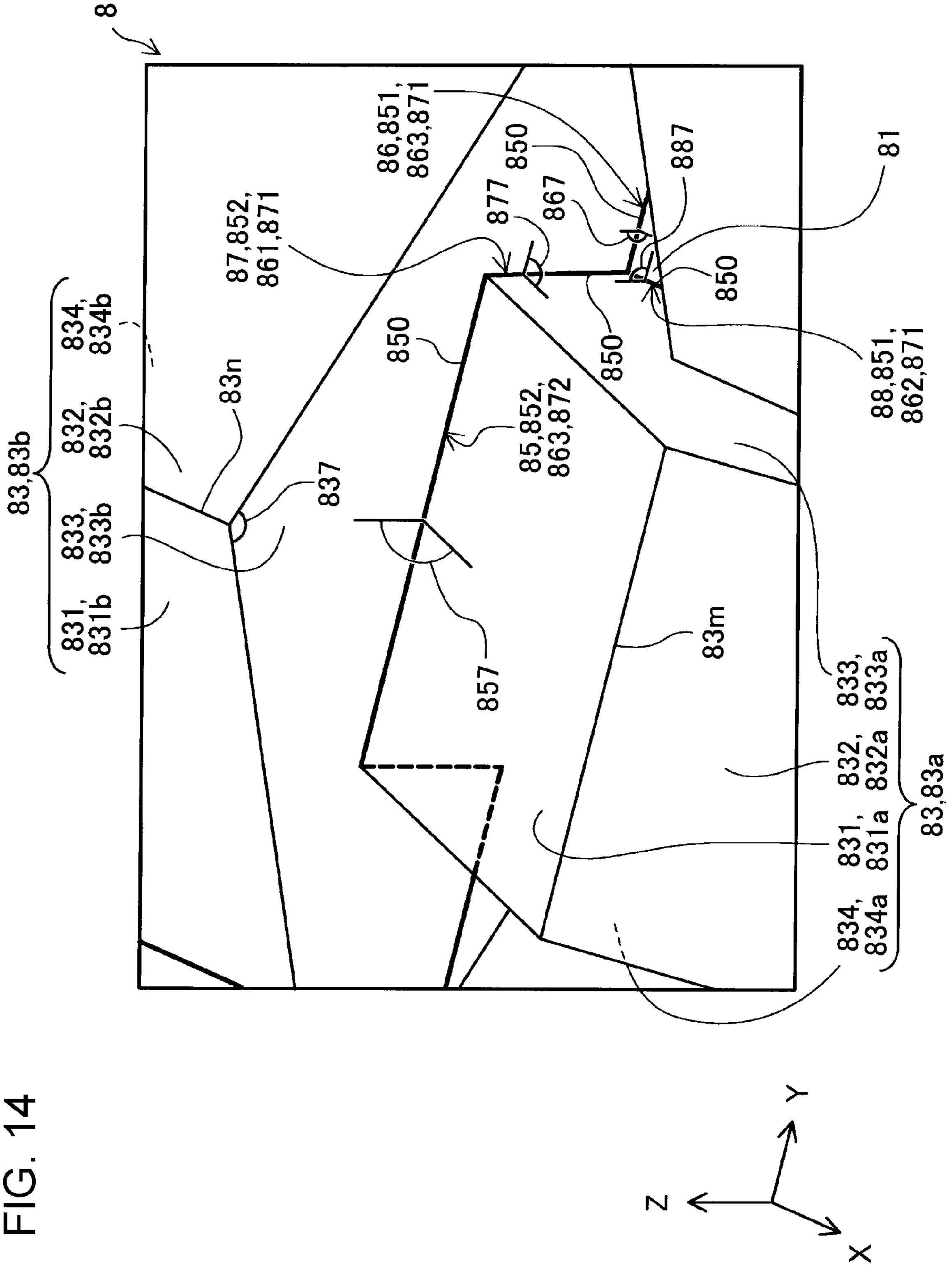
FIG. 14 is an enlarged view of part of a liquid holding member illustrated in FIG. 13.
Figure 15:
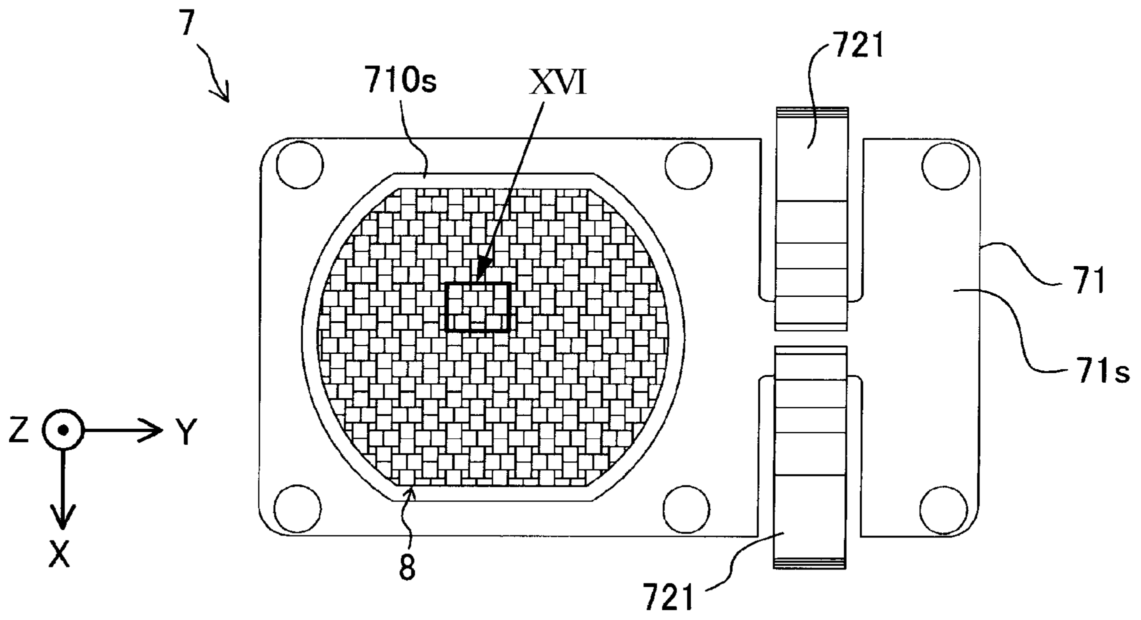
FIG. 15 is a diagram of the cap on the side of a facing surface.
Figure 16:
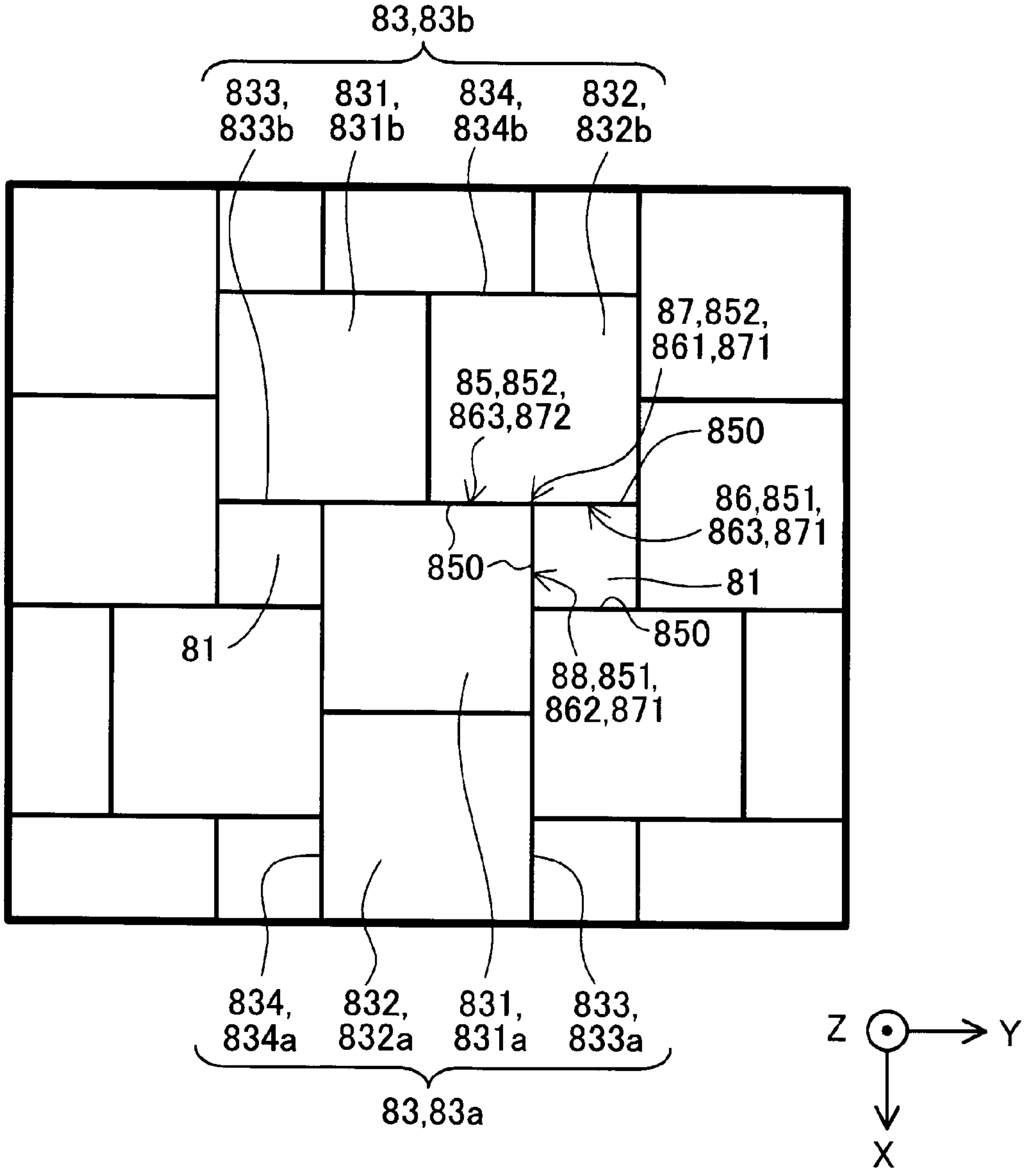
FIG. 16 is an enlarged view of a region in FIG. 15.

FIG. 13 is an enlarged view of a region XIII in FIG. 12. FIG. 13 is a perspective view illustrating the detailed structure of the liquid holding member 8. FIG. 14 is an enlarged view of part of the liquid holding member 8 illustrated in FIG. 13. FIG. 15 is a diagram of the cap 7 as viewed from the side of the facing surface 71*s*. FIG. 16 is an enlarged view of a region XVI in FIG. 15. FIG. 16 is a top view illustrating the detailed structure of the liquid holding member 8 and illustrates the state of the liquid holding member 8 as viewed in the +Z direction. The liquid holding member 8 includes a bottom surface 81, a plurality of convex portions 83, and a plurality of edge portions 85 to 88.

As illustrated in FIG. 13, the convex portions 83 are disposed on the bottom surface 81. The bottom surface 81 is a substantially plate-like member formed so as to be substantially parallel to the facing surface 71*s* illustrated in FIG. 12. That is, the bottom surface 81 is formed to extend in the X direction and the Y direction. The bottom surface 81 forms the bottom of the recessed portion 710*s*.

In the following description, in the liquid holding member 8, the direction in which the convex portions 83 project orthogonally to the bottom surface 81 is a first direction. The two directions that are orthogonal to the first direction and orthogonal to each other are a second direction and a third direction. In the embodiment, the first direction is the Z direction, which coincides with the thickness direction of the cap 7. The second direction is the X direction, which coincides with the lateral direction of the cap 7. The third direction is the Y direction, which coincides with the longitudinal direction of the cap 7.

The plurality of convex portions 83 are formed on the bottom surface 81 so as to project from the bottom surface 81. The convex portions 83 are molded integrally with the bottom surface 81. The convex portions 83 and the bottom surface 81 form polyhedrons.

In addition, a plurality of convex portion sets 830, each of which includes two or more different convex portions 83, are arranged in at least one of the second direction and the third direction. In the embodiment, as illustrated in FIG. 13, the plurality of convex portion sets 830, each of which includes the first convex portion 83*a* and the second convex portion 83*b*, adjacent to each other, that have a first top edge 83*m* and a second top edge 83*n* in different directions among the second direction and the third direction, are arranged in the second direction and the third direction. In other words, the first convex portion 83*a* as the convex portion 83 and the second convex portion 83*b* as the convex portion 83 are alternately arranged in the X direction and the Y direction. The first convex portion 83*a* overlaps the second convex portion 83*b* when the first convex portion 83*a* rotates 90 degrees about the Z-axis extending in the Z direction on the bottom surface 81 that is parallel to the X-Y plane. That is, the first convex portion 83*a* and the second convex portion 83*b* have the same shape with the exception of the orientations of the convex portion 83*a* and 83*b* disposed on the bottom surface 81. The first convex portion 83*a* and the second convex portion 83*b* are simply referred to as the convex portions 83 when there is no need to distinguish these convex portions.

As illustrated in FIG. 13, each of the convex portions 83 is formed by a plurality of surfaces 831 to 834. Specifically, the convex portion 83 includes the first top surface 831, the second top surface 832, the first side surface 833, and the second side surface 834. The individual surfaces 831 to 834 are flat surfaces.

The first side surface 833 and the second side surface 834 are substantially orthogonal to the bottom surface 81. The first side surface 833 and the second side surface 834 are parallel to the X-Z plane, which is parallel to the X direction and the Z direction, or parallel to the YZ plane, which is parallel to the Y direction and the Z direction. The first side surface 833 and the second side surface 834 face each other in parallel either in the X direction as the second direction or in the Y direction as the third direction. In the embodiment, the first side surface 833*a* of the first convex portion 83*a* and the second side surface 834*a* of the first convex portion 83*a* face away from each other in the Y direction. The first side surface 833*b* of the second convex portion 83*b* and the second side surface 834*b* of the second convex portion 83*b* face away from each other in the X direction.

The first top surface 831 is coupled to the second top surface 832, the first side surface 833, and the second side surface 834. The second top surface 832 is coupled to the first top surface 831, the first side surface 833, and the second side surface 834. The top edge 83*m* that is the coupling portion between the first top surface 831 and the second top surface 832 and the top edge 83*n* that is the coupling portion between the first top surface 831 and the second top surface 832 form lines extending in the X direction or the Y direction. In the embodiment, the first top edge 83*m* as the top edge 83*m* of the first convex portion 83*a* extends in the Y direction. The second top edge 83*n* as the top edge 83*n* of the second convex portion 83*b* extends in the X direction. The top edges 83*m* and 83*n* form the vertexes of the convex portion 83.

The first top surface 831 and the second top surface 832 extend so as to be oblique to the bottom surface 81 instead of parallel to the bottom surface 81. The first top surface 831 is inclined so as to be closer to the bottom surface 81 with distance from the first top edge 83*m*. The second top surface 832 extends so as to be inclined toward the bottom surface 81 with distance from the second top edge 83*n*. In the embodiment, the first top surface 831 and the second top surface 832 are inclined such that an inner angle 837 formed by the top edges 83*m* and 83*n*, that is, the inner angle 837 formed by the first top surface 831 and the second top surface 832 is 120 degrees. It should be noted that the top edges 83*m* and 83*n* are the coupling portions formed by two faces 831 and 832 of a single convex portion 83, so the top edges 83*m* and 83*n* are not the edge portions 85 to 88, which will be described in detail later.

In addition, the first top surface 831*a* of the first convex portion 83*a* is coupled to the first side surface 833*b* of the second convex portions 83*b* adjacent to the first convex portion 83*a* while forming a ridge line 850. The second top surface 832*a* of the first convex portion 83*a* is coupled to the second side surface 834*b* of the second convex portion 83*b* adjacent to the first convex portion 83*a* while forming a ridge line 850. In addition, the first top surface 831*b* of the second convex portion 83*b* is coupled to the first side surface 833*a* of the first convex portion 83*a* adjacent to the second convex portion 83*b* while forming a ridge line 850. The second top surface 832*b* of the second convex portion 83*b* is coupled to the second side surface 834*a* of the first convex portion 83*a* adjacent to the second convex portion 83*b* while forming a ridge line 850. That is, the adjacent convex portions 83*a* and 83*b* are in contact with each other without gaps.

The plurality of edge portions 85 to 88 hold the liquid due to a capillary force. As illustrated in FIG. 13, the edge portions 85 to 88 are formed by coupling two planes between the plane 81 and the planes 831 to 834. Pairs of adjacent edge portions 85 to 88 of the plurality of edge portions 85 to 88 are coupled to each other. In FIG. 13, for ease of understanding, some of the ridge lines 850 formed by coupling the adjacent edge portions 85 to 88 are indicated by thick lines. In FIGS. 13 and 16, a first representative edge portion 85, a second representative edge portion 86, a third representative edge portion 87, and a fourth representative edge portion are illustrated on behalf of the edge portions 85 to 88 88.

Each of the plurality of edge portions 85 to 88 is one of the first edge portion 851 and the second edge portion 852. The first edge portion 851 is formed by the bottom surface 81 and the surfaces 833 and 834 of the convex portions 83 that are adjacent to each other with the ridge line 850 present therebetween. The first edge portion 851 is the fourth representative edge portion 88 formed by, for example, the bottom surface 81 and the first side surface 833*a* of the first convex portion 83*a* that are adjacent to each other with the ridge line 850 present therebetween. In addition, the first edge portion 851 is the second representative edge portion 86 formed by, for example, the bottom surface 81 and the first side surface 833*b* of the second convex portion 83*b* that are adjacent to each other with the ridge line 850 present therebetween. The second edge portions 852 are formed by the surfaces 831*a* to 834*a* of the first convex portion 83*a* and the surfaces 831*b* to 834*b* of the second convex portion 83*b* that are adjacent to each other with the ridge lines 850 present therebetween. The second edge portion 852 is the first representative edge portion 85 formed by, for example, the first top surface 831*a* of the first convex portion 83*a* and the first side surface 833*b* of the second convex portion 83*b* that are adjacent to each other with the ridge line 850 present therebetween. The second edge portion 852 is the third representative edge portion 87 formed by, for example, the first side surface 833*a* of the first convex portion 83*a* and the first side surface 833*b* of the second convex portion 83*b* that are adjacent to each other with the ridge line 850 present therebetween.

Angles 867 and 887 formed by at least one of the first edge portions 851 and the angles 857 and 877 formed by at least one of the second edge portions 852 are equal to or less than 90 degrees. In the embodiment, the angles 867 and 887 formed by the first edge portion 851 and the angles 857 and 877 formed by the second edge portion 852 are both equal to or less than 90 degrees. However, the present disclosure is not limited to this example.

In addition, in the embodiment, the ridge lines 850 that form the first edge portion 851 and the second edge portion 852 include different components among a component in the first direction, a component in the second direction component, and a component in the third direction component. In other words, the plurality of ridge lines 850 include any of the first direction component, the second direction component, and the third direction component and extend in different directions. Then, the plurality of ridge lines 850 are coupled continuously. Accordingly, in the embodiment, the plurality of edge portions 85 to 88 can be classified into a class 1 edge portion 861, a class 2 edge portion 862, and a class 3 edge portion 863. The class 1 edge portion 861 extends in a direction having the first direction component. In the example illustrated in FIG. 13, the class 1 edge portion 861 is the third representative edge portion 87. The class 2 edge portion 862 extends in a direction having the second direction component. In the example illustrated in FIG. 13, the class 2 edge portion 862 is the fourth representative edge portion 88. The class 3 edge portion 863 extends in a direction having the third direction component. In the example illustrated in FIG. 13, the class 3 edge portions 863 are the first representative edge portion 85 and the second representative edge portion 86. That is, in the liquid holding member 8, the plurality of edge portions 85 to 88 are formed in the three-dimensional directions by the ridge line 850 extending in any of the X direction, the Y direction, and the Z direction. In this structure, when a liquid adheres to the liquid holding member 8, the liquid does not stay at the top edges 83*m* and 83*n* and flows toward the plurality of edge portion 85 to 88. Then, the liquid accumulates so as to suit the shapes of the edge portions 85 to 88 that extend in the three-dimensional directions, so the liquid spreads substantially uniformly and held on the liquid holding member 8.

Furthermore, in the embodiment, as illustrated in FIG. 14, the plurality of the edge portions 85 to 88 have a bottom surface side edge portion 871 located closer to the bottom surface 81 and a front surface side edge portion 872 located farther from the bottom surface 81 than the bottom surface side edge portion 871. In the example illustrated in FIG. 14, the bottom surface side edge portions 871 are the second representative edge portion 86, the third representative edge portion 87, and the fourth representative edge portion 88. In addition, the front surface side edge portion 872 is the first representative edge portion 85.

Here, when the cartridge 4 in the engagement state is impacted by a drop or the like, the liquid held in the front surface side edge portion 872 is more likely to leak or splash to the outside of the liquid holding member 8 than the liquid held in the bottom surface side edge portion 871. When, for example, the liquid leaks to the outside of the liquid holding member 8, even if the cap 7 is attached to the cartridge 4, the liquid may leak to the outside of the cartridge 4 and the cap 7 through, for example, the gap between the facing surface 71*s* and the cartridge bottom surface 44*a*. Accordingly, the front surface side edge portion 872 may have a larger holding force for holding the liquid than the bottom surface side edge portion 871. At this time, generally, the holding force of the liquid can be improved by reducing the contact angle between the liquid and the surfaces 831 to 834 that form the edge portions 85 to 88 to increase the surface tensions of the edge portions 85 to 88. Accordingly, the more acute the angles 857, 867, 877, and 887 formed by the edge portions 85 to 88, the greater the force for holding the liquid due to a capillary force.

Therefore, in the embodiment, the plurality of edge portions 85 to 88 are formed such that at least one of the angles 857 formed by the front surface side edge portions 872 is smaller than the angles 867, 877, and 887 formed by the bottom surface side edge portions 871. In FIG. 13, any of the angles 857 formed by the front surface side edge portions 872 are smaller than the angles 867, 877, and 887 formed by the bottom surface side edge portions 871. Specifically, the angle 867 formed by the second representative edge portion 86 as the bottom surface side edge portion 871 is 90 degrees. The angle 877 formed by the third representative edge portion 87 is 90 degrees. The angle 887 formed by the fourth representative edge portion 88 is 90 degrees. On the other hand, the angle 857 formed by the first representative edge portion 85 as the front surface side edge portion 872 is 60 degrees and the angle 857 is smaller than the angles 867, 877, and 887 formed by the bottom surface side edge portion 871, which are 90 degrees. That is, in the engagement state, the liquid holding member 8 is formed such that the angle 857 formed by the front surface side edge portion 872 formed closer to the discharge opening portion 432 illustrated in FIG. 8 is more acute than the bottom surface side edge portion 871.

In the first embodiment, as illustrated in FIG. 12, part of the cap 7 can be used as the bottom surface 81 to form the liquid holding member 8. That is, the liquid holding member 8 can be molded integrally with the formed member. This can reduce the time and man-hours required to form the liquid holding member 8 in the formed member.

In addition, in the first embodiment described above, as illustrated in FIGS. 13 and 14, the liquid holding member 8 formed in the cap 7 includes the bottom surface 81 and the convex portions 83 formed by a plurality of surfaces 831 to 834, project from the bottom surface 81, and is molded integrally with the bottom surface 81. Accordingly, the liquid holding member 8 has the first edge portion 851 formed by the bottom surface 81 and the surfaces 833 and 834 of the convex portion 83 with the ridge line 850 present therebetween, and the second edge portion 852 formed by the surfaces 831 to 834 of an adjacent convex portion 83 with the ridge line 850 present therebetween. At this time, the angles 857, 867, 877, and 887 formed by at least one set of edge portions 85 to 88 of the plurality of sets of edge portions 85 to 88 are 90 degrees or less. In this structure, when a liquid adheres to the liquid holding member 8 in the engagement state in which the cap 7 has been attached to the cartridge 4, the liquid is sucked to the edge portions 85 to 88 by a capillary force and stays in the edge portions 85 to 88. That is, by use of a capillary force acting on the edge portions 85 to 88 formed continuously, the liquid holding member 8 can hold the liquid without providing, as another member, a liquid absorbing material like a porous body having a structure capable of absorbing liquid. Accordingly, the liquid holding member 8 need not be formed by a material having the property of absorbing liquid, such as a porous body formed by a synthetic resin such as polyvinyl alcohol. Accordingly, the liquid holding member 8 can be formed of a material or a structural body that can be reused by being washed. Therefore, even when a liquid adheres to the liquid holding member 8 and the liquid is held by the liquid holding member 8, the liquid holding member 8 can be reused by being washed.

In addition, in the first embodiment, it is possible to restore the holding force of a liquid of the liquid holding member 8 to the state before the liquid is held, by being washed. This enables the liquid holding member 8 to be used repeatedly.

In addition, in the liquid holding member 8 according to the first embodiment described above, as illustrated in FIG. 13, the edge portions 85 to 88 for holding a liquid may be formed by forming the plurality of convex portions 83 that project from the bottom surface 81. That is, the liquid holding member 8 can acquire the ability to hold a liquid due to structural features even though the material itself does not have the property of absorbing liquid. Accordingly, restrictions on the types of materials included in the liquid holding member 8 can be reduced, so that the liquid holding member 8 can be formed by the materials that can be molded integrally with the cap body portion 71 included in the liquid holding member.

In addition, in the first embodiment, the time and man-hours required to assemble the cap 7 can be reduced and the liquid holding member 8 can be reused by being washed. This can resolve various troubles that occur in the cap 7.

In addition, in the first embodiment described above, as illustrated in FIG. 13, the first direction coincides with the direction in which the convex portions 83 project orthogonally to the bottom surface 81. The second direction and the third direction are orthogonal to the first direction and orthogonal to each other. That is, the first direction, the second direction, and the third direction are the three-dimensional directions. In addition, the plurality of edge portions 85 to 88 have the class 1 edge portion 861 with a component in the first direction, the class 2 edge portion 862 with a component in the second direction, and the class 3 edge portion 863 with a component in the third direction component. This can form a plurality of edge portions 85 to 88 in the three-dimensional directions in the liquid holding member 8. In this structure, the range of the liquid retention region achieved by the plurality of edge portions 85 to 88 continuously formed can be expanded to the range in the three-dimensional directions. Furthermore, compared with the case in which the edge portions 85 to 88 extend in only one direction, the number of the edge portions 85 to 88 can be increased in the first embodiment. Accordingly, when a liquid adheres to the liquid holding member 8, the liquid can be held with greater certainty.

In addition, in the first embodiment, some of the plurality of edge portions 85 to 88 extend in the first direction. Accordingly, in the depth direction that coincides with the first direction and in the depth direction with respect to the surface side of the liquid holding member 8 to the side of the bottom surface 81, the liquid holding region can be acquired with greater certainty. Therefore, the liquid the holding force of the liquid in the liquid holding member 8 can be further improved.

In the first embodiment described above, as illustrated in FIG. 14, the plurality of edge portions 85 to 88 include the bottom surface side edge portion 871 and the front surface side edge portion 872 located farther from the bottom surface 81 than the bottom surface side edge portion 871. At this time, the angle 857 formed by at least one of the front surface side edge portions 872 is smaller than the angles 867, 877, and 887 formed by the bottom surface side edge portion 871. In this structure, the liquid holding force in the front surface side edge portion 872 can be larger than the liquid holding force in the bottom surface side edge portion 871. Accordingly, in the engagement state, when the cartridge 4 and the cap 7 are impacted by a drop or the like, the holding force of the front surface side edge portion 872 from which the held liquid is more likely to leak outside than the bottom side edge portion 871 can be improved. This can cause the liquid holding member 8 to hold the liquid with greater certainty. Accordingly, since the liquid leaks outside without being held by the liquid holding member 8, it is possible to further reduce the possibility of leakage of the liquid to the outside from the gap between the facing surface 71*s* and the cartridge bottom surface 44*a*. Accordingly, it is possible to prevent the liquid leaking from the discharge opening portion 432 from being splashed outside or adhering to other objects.

In the first embodiment described above, as described in FIG. 8, the liquid holding member 8 is formed on the facing surface 71*s* that faces the liquid supply portion 442 of the cap 7 detachably attached to the cartridge 4 having the liquid supply portion 442. In this structure, in the engagement state in which the cartridge 4 has engaged the cap 7, the liquid holding member 8 can more hold the liquid leaked through the discharge opening portion 432 with greater certainty.

In addition, in the first embodiment described above, as illustrated in FIGS. 8 and 9, the liquid holding member 8 is formed at a position on the facing surface 71*s* that faces the discharge opening portion 432. As a result, in the engagement state in which the cartridge 4 has engaged the cap 7, the liquid leaked through the discharge opening portion 432 can be held with much greater certainty.

B. Second Embodiment

Figure 17:
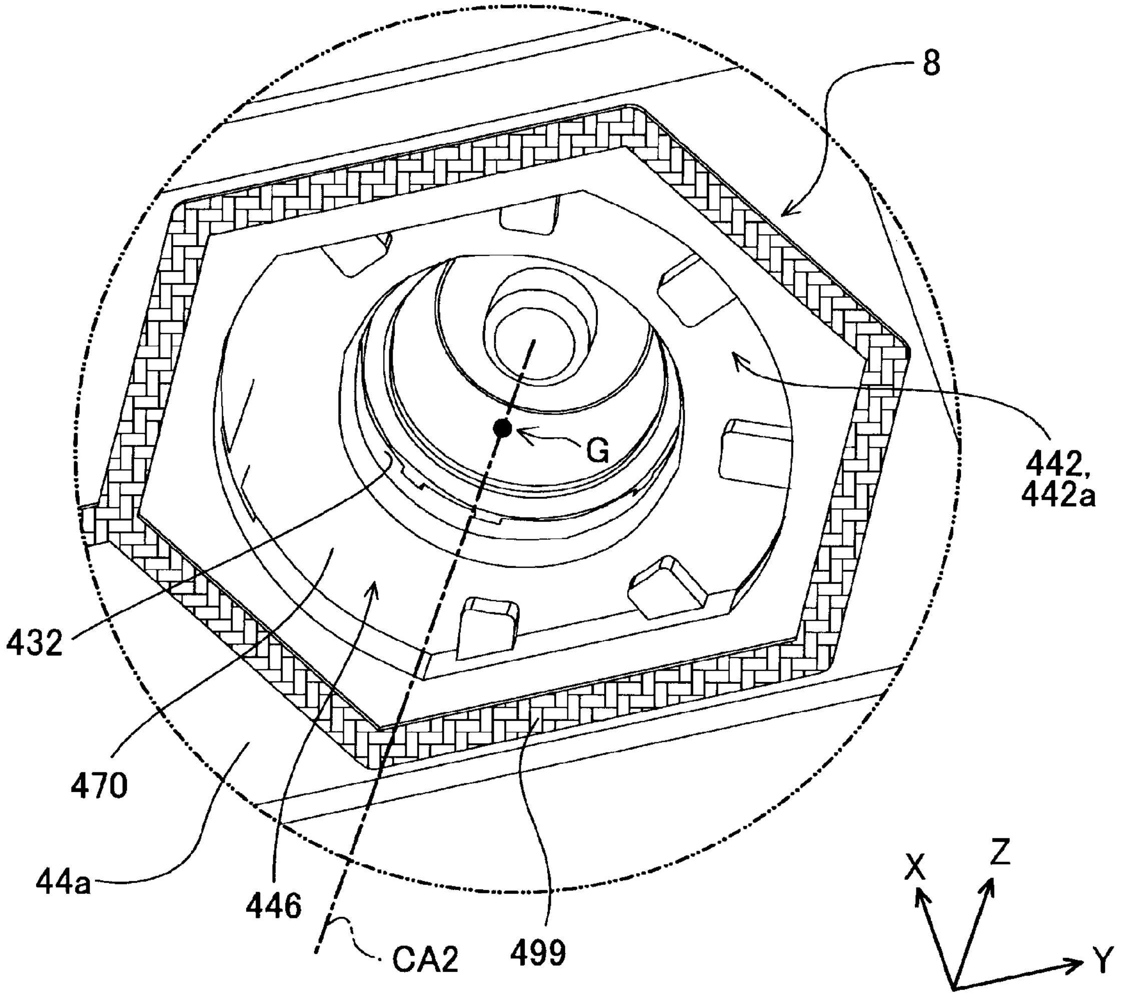
FIG. 17 is a diagram for describing the formation position of a liquid holding member according to a second embodiment.

FIG. 17 is a diagram for describing the formation position of the liquid holding member 8 according to a second embodiment. FIG. 17 is an enlarged view illustrating the bottom opening portion 446 of the cartridge 4 illustrated in FIG. 7 and the surroundings of the bottom opening portion 446. In the embodiment, the formation position of the liquid holding member 8 differs from that in the first embodiment illustrated in FIG. 12. The structure of the liquid holding member 8 is identical to the structure according to the first embodiment illustrated in FIGS. 13 and 16. Accordingly, in the embodiment, the liquid holding member 8 holds the liquid due to a capillary force as in the first embodiment. The components as those in the first embodiment are denoted by the same reference numerals and descriptions thereof are omitted. In the second embodiment, the bottom surface 81 of the liquid holding member 8 is the cartridge bottom surface 44*a* and the projecting direction of the convex portions 83 is the −Z direction.

The liquid holding member 8 is formed in at least part of the circumference around the supply-portion-side central axis CA2 in a position on the cartridge bottom surface 44*a* in which the bottom opening portion 446 is surrounded. The supply-portion-side central axis CA2 extends in the Z direction in which the liquid supply portion 442 extends, as in FIG. 7.

In the embodiment, the liquid holding member 8 is formed on the outer edge portion 499. In FIG. 17, the portion in which the liquid holding member 8 is formed is cross-hatched. The outer edge portion 499 here refers to the portion of the cartridge bottom surface 44*a* that is formed in a circumference around the supply-portion-side central axis CA2 at the position at which the bottom opening portion 446 is surrounded. In the example illustrated in FIG. 17, the outer edge portion 499 has a substantially hexagonal shape with the supply-portion-side central axis CA2, is located on an X-Y plane parallel to the cartridge bottom surface 44*a*, and has a gravity center G and has an opening in the central portion containing the bottom opening portion 446.

In the second embodiment described above, the liquid holding member 8 is formed on the outer edge portion 499 formed in the circumference around the supply-portion-side central axis CA2 at a position on the cartridge bottom surface 44*a* at which the bottom opening portion 446 is surrounded. In this structure, the liquid leaked through the discharge opening portion 432 can be held in the vicinity of the liquid supply portion 442. This can reduce the possibility of adherence of the liquid to the periphery of the liquid supply portion 442 when the liquid leaks through the discharge opening portion 432 in the insertion complete state illustrated in FIG. 5 or the attachment complete state illustrated in FIG. 6.

In addition, in the second embodiment described above, if the liquid leaks through the discharge opening portion 432 when the cap 7 is not attached to the cartridge 4 as illustrated in FIG. 7, the possibility of splashing of the liquid can be reduced.

It should be noted that the shape of the liquid holding member 8 formed on the cartridge bottom surface 44*a* is not limited to this shape and may be another shape. The liquid holding member 8 need not be formed in the circumference around the supply-portion-side central axis CA2 in a position on the cartridge bottom surface 44*a* in which the bottom opening portion 446 is surrounded and need only be formed at least part of the circumference.

The formation position of the liquid holding member 8 is not limited to this. The liquid holding member 8 need only be formed at a position at which the liquid that has leaked from the discharge opening portion 432 is easily held and may be formed on, for example, the peripheral edge portion 470 illustrated in FIG. 17. The peripheral portion 470 here is formed in the circumferential direction along the discharge opening portion 432 in the liquid supply portion 442. The peripheral edge portion 470 is formed within the circumference around the supply-portion-side central axis CA2 inward of the outer edge portion 499 and on the side in the +Z direction closer to the discharge opening portion 432 than the outer edge portion 499.

C. Third Embodiment

Figure 18:
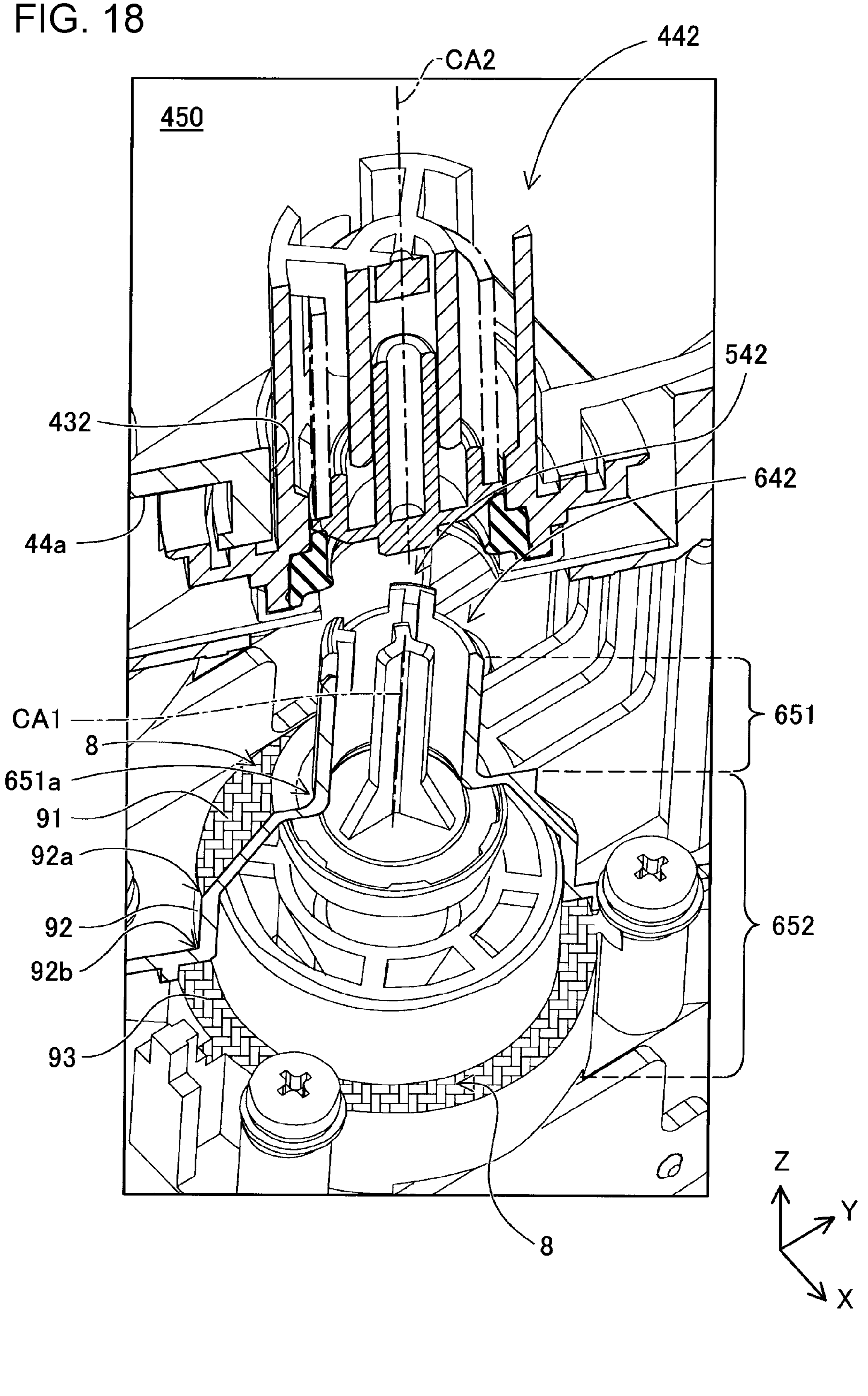
FIG. 18 is a diagram for describing the formation position of a liquid holding member according to a third embodiment.

FIG. 18 is a diagram for describing the formation position of the liquid holding member 8 in the third embodiment. FIG. 18 is a partially sectional view of the discharge opening portion 432 and the liquid supply portion 442 in the insertion complete state illustrated in FIG. 4. FIG. 18 illustrates the state in which the liquid supply portion 442 is taken along the Y-Z plane passing through the supply-portion-side central axis CA2. In addition, FIG. 18 illustrates part of the structure of the liquid inlet portion 642 together.

In the embodiment, the formation position of the liquid holding member 8 differs from that in the first embodiment illustrated in FIG. 12 and that in the second embodiment illustrated in FIG. 17. The structure of the liquid holding member 8 is identical to the structure in the first embodiment illustrated in FIGS. 13 and 16. Accordingly, even in the embodiment, the liquid holding member 8 holds the liquid due to a capillary force. The same components as in the first embodiment and the second embodiment are denoted by the same reference numerals and descriptions thereof are omitted. In the third embodiment, the bottom surface 81 of the liquid holding member 8 is part of the liquid inlet portion 642. The specific formation position of the liquid holding member 8 and the projecting direction of the convex portions 83 will be described later.

The liquid inlet portion 642 includes a tip portion 651 to be inserted into the liquid supply portion 442 and a base end portion 652 located in the −Z direction with respect to the tip portion 651, which is the side in the direction of gravity. At this time, in the insertion complete state of the cartridge 4, the side of the base end portion 652 is the side in the direction of gravity, and the side of the tip portion 651 is the side in the direction opposite to the direction of gravity. In the example illustrated in FIG. 18, the tip portion 651 is formed to have a smaller diameter than the base end portion 652 in the radial direction around the inlet-side central axis CA1.

The base end portion 652 includes an inclined portion 91, a body portion 92, and an end portion 93. The inclined portion 91 is located on the side in the +Z direction of the base end portion 652 closest to the tip portion 651. The end portion 93 is located on the side in the −Z direction of the base end portion 652 farthest from the tip portion 651. The body portion 92 is located between the inclined portion 91 and the end portion 93 and couples the inclined portion 91 and the end portion 93 to each other. In the example illustrated in FIG. 18, the inclined portion 91 projects from a first end 92*a* of the body portion 92 toward a first 651*a* of the tip portion 651 and has a dome shape with an opening at the one end 651*a* of the tip portion 651. The inclined portion 91 decreases in diameter with distance from the first end 92*a* of the body portion 92. The body portion 92 is formed so as to extend in the Z direction over the circumference around the inlet-side central axis CA1. The body portion 92 is substantially cylindrical. The end portion 93 is formed so as to be coupled to the second end 92*b* of the body portion 92 and extend in the X direction over the circumference around the inlet-side central axis CA1. That is, the end portion 93 faces the cartridge bottom surface 44*a* in the insertion complete state. It should be noted that the base end portion 652 illustrated in FIG. 18 is an example of the base end portion 652, and the shape and the structure of the base end portion 652 are not limited to those illustrated.

The liquid holding member 8 is formed on the surface of the base end portion 652 of the liquid inlet portion 642. The surface here refers to a surface formed on the outside of the liquid inlet portion 642 in which the side closer to the inlet-side central axis CA1 is the inside and the side away from the inlet-side central axis CA1 is the outside. In the embodiment, the liquid holding member 8 is formed on each of the inclined portion 91 and the end portion 93 of the base end portion 652. In FIG. 18, the portion in which the liquid holding member 8 is formed is cross-hatched. In the liquid holding member 8 formed on the inclined portion 91, the projecting direction of the convex portions 83 is substantially orthogonal to the bottom surface 81. In addition, in the liquid holding member 8 formed on the end portion 93, the projecting direction of the convex portions 83 is the +Z direction in which the cartridge bottom surface 44*a* is located in the insertion complete state.

In the third embodiment described above, the liquid holding member 8 is formed on the surface of the base end portion 652 of the liquid inlet portion 642. In this structure, in the insertion complete state illustrated in FIG. 5 and the insertion complete state illustrated in FIG. 6, the liquid that has leaked from the discharge opening portion 432 can be held by the liquid inlet portion 642 located in the direction of gravity. That is, the liquid can be held in the vicinity of the coupling portion 542 between the liquid supply portion 442 and the liquid inlet portion 642. This can cause the liquid holding member 8 to easily hold the liquid when the liquid leaked through the discharge opening portion 432 drips on the side of the liquid inlet portion 642. This can reduce the possibility of leakage of the liquid to the outside as the portion other than the liquid supply portion 442 and the liquid inlet portion 642.

In addition, in the third embodiment described above, the liquid holding member 8 is formed on the inclined portion 91 on the side of the surface of the base end portion 652 of the liquid inlet portion 642 close to in the coupling portion 542 between the liquid supply portion 442 and the liquid inlet portion 642. In this structure, the liquid holding member 8 on the inclined portion 91 quickly holds the liquid leaked through the discharge opening portion 432 in the insertion complete state and the liquid that has leaked from the coupling portion 542 in the attachment complete state.

In the third embodiment described above, the liquid holding member 8 is formed on the end portion 93 on the side in the direction of gravity of the inclined portion 91 on the surface of the base end portion 652 of the liquid inlet portion 642. In this structure, for example, the liquid leaked through the discharge opening portion 432 in the insertion complete state or the liquid that has leaked from the coupling portion 542 in the attachment complete state can be held, like a saucer, by the liquid holding member 8 formed in the end portion 93. This can further reduce the possibility of leakage of the liquid to the outside as the portion other than the liquid supply portion 442 and the liquid inlet portion 642.

In addition, in the third embodiment, the liquid holding member 8 is formed in each of the inclined portion 91 and the end portion 93. In this structure, when the liquid that could not be held by the inclined portion 91 flows to the end portion 93, the end portion 93 can hold the liquid. This can further reduce the possibility of leakage of the liquid to the outside as the portion other than the liquid supply portion 442 and the liquid inlet portion 642.

D. Other Embodiments

In the first embodiment described above, as illustrated in FIG. 12, the liquid holding member 8 is formed in part of the cap 7 detachably attached to the cartridge 4. In the second embodiment described above, as illustrated in FIG. 17, the liquid holding member 8 is formed at a position on the cartridge 4 that contains the liquid at which the bottom opening portion 446 is surrounded through which the liquid supply portion 442 is exposed. In the third embodiment described above, as illustrated in FIG. 18, the liquid holding member 8 is formed on the surface of the base end portion 652 of the liquid inlet portion 642 provided in the printing device 10. However, the place on which the liquid holding member 8 is formed is not limited to this surface. The liquid holding member 8 may be formed on, for example, part of the ink supply container that replenishes a liquid ink to the ink tank provided at the printing device 10.

E. Other Aspects

The present disclosure is not limited to the embodiments described above and may be achieved in various structures without departing from the spirit of the disclosure. For example, the technical features of the embodiments corresponding to the technical features of the aspects described in Summary may be replaced or combined as appropriate to achieve to solve some or all of the problems described above or achieve some or all of the effects described above. In addition, the technical features can be deleted as appropriate unless the technical features are described as essential in this specification.

1. According to a first aspect of the present disclosure, a liquid holding member is provided. This liquid holding member includes a bottom surface; and a plurality of convex portions projecting from the bottom surface, each of the convex portions including a plurality of surfaces, in which the plurality of convex portions are molded integrally with the bottom surface. In the aspect, the liquid holding member has a plurality of continuously formed edge portions molded integrally with the bottom surface. In the aspect, part of a formed member such as a cap can be used as the bottom surface to form the liquid holding member. That is, the liquid holding member can be molded integrally with the formed member. This can reduce the time and man-hours required to form the liquid holding member in the formed member.

2. According to a second aspect of the present disclosure, a liquid holding member is provided. This liquid holding member includes a bottom surface; a plurality of convex portions projecting from the bottom surface, each of the convex portions including a plurality of surfaces; a plurality of first edge portions formed by the bottom surface and the surfaces of the convex portions with ridge lines present therebetween; and a plurality of second edge portions formed by adjacent surfaces of the convex portions with ridge lines present therebetween. In the aspect, the liquid holding member can hold liquid by using a capillary force acting the plurality of first edge portions and the plurality of second edge portions. That is, the liquid holding member can acquire the ability to hold liquid due to structural features even though the material itself does not have the property of absorbing liquid. Since this can reduce restrictions on the types of materials included in the liquid holding member, it is possible to use the materials that can be molded integrally with the formed member included in the liquid holding member and that can be reused by being washed. In addition, when liquid is held in the liquid holding member, the liquid holding member can be reused by being washed. As described above, various problems that occur in conventional formed member such as the related-art cap can be solved.

3. In the aspect described above, the angle formed by at least one of the first edge portions and the angle formed by at least one of the second edge portions may be 90 degrees or less. In the aspect, by setting the angle formed by at least one of the first edge portions and the angle formed by at least one of the second edge portions to 90 degrees or less, a capillary force acting on the first edge portion and the second edge portion can be increased. Accordingly, when liquid adheres to the liquid holding member, the liquid holding member can hold the liquid with greater certainty.

4. In the aspect, when the direction in which the convex portions project from the bottom surface is the first direction and the two directions orthogonal to the first direction and are orthogonal to each other are the second direction and the third direction, the ridge lines of the first edge portion and the ridge lines of the second edge portion may include different components among a component in the first direction, a component in the second direction component, and a component in the third direction component. In the aspect, the liquid holding member can form the plurality of first edge portions and the plurality of second edge portions that extend in different directions among the three-dimensional directions. Accordingly, when the liquid adheres to the liquid holding member, the liquid holding member can hold the liquid with greater certainty.

5. In the aspect described above, the angle formed by at least one of the second edge portions may be smaller than the angles formed by the first edge portions. In the aspect, a capillary force acting on the second edge portion for which the formed angle is smaller than that of the first edge portion can be larger than the capillary force acting on the first edge portion. This can further improve the holding force of the liquid in the second edge portion from which the held liquid is more likely to leak to the outside than the first edge portion.

6. According to a third aspect of the present disclosure, a liquid holding member is provided. This liquid holding member includes a bottom surface; and a plurality of convex portions projecting from the bottom surface, each of the convex portions including a plurality of surfaces, in which, when a direction orthogonally to the bottom surface is a first direction and two directions that are orthogonal to the first direction and orthogonal to each other are a second direction and a third direction, a plurality of convex portion sets, each of which includes two or more different convex portions of the convex portions, are arranged in at least one of the second direction and the third direction. In the aspect, the plurality of first convex portions and the plurality of second convex portions can be formed by arranging the plurality of convex portion sets, each of which includes two or more different convex portions, side by side in the second direction and the third direction on the bottom surface.

7. According to a fourth aspect of the present disclosure, a cap is provided. The cap to be detachably attached to a cartridge having a liquid supply portion includes a facing surface that faces the liquid supply portion; and the liquid holding member according to the first aspect, the liquid holding member being disposed on the facing surface. In the aspect, by attaching the cap in which the liquid holding member is formed to the cartridge, the liquid holding member can hold the liquid that has leaked from the liquid supply portion. Accordingly, it is possible to reduce the possibility of the leakage of the liquid from the liquid supply portion to the outside of the cartridge and the outside of the cap or the splashing of the liquid.

8. In the aspect described above, the liquid supply portion has the discharge opening portion through which the liquid contained in the cartridge is discharged to the outside, and the liquid holding member may be formed at a position on the facing surface at which the liquid holding member faces the discharge opening portion. In the aspect, when the cap in which the liquid holding member has been formed is attached to the cartridge, the liquid holding member can be formed at a position at which the liquid holding member faces the discharge opening portion from which the liquid is suppled. This can cause the liquid holding member to hold the liquid leaked through the discharge opening portion with greater certainty.

9. According to a fifth aspect of the present disclosure, a cartridge is provided. This cartridge includes a liquid supply portion having a central axis; a cartridge bottom surface; and the liquid holding member according to the first aspect, in which the cartridge bottom surface has a bottom opening portion through which the liquid supply portion is exposed, and the liquid holding member is formed in at least part of a circumference around the central axis in a position on the cartridge bottom surface, the bottom opening portion being surrounded in the position. In the aspect, when the liquid contained in the cartridge leaks from the liquid supply portion, the liquid holding member formed closer to the bottom opening portion can hold the liquid. This can reduce the possibility of adherence of the liquid to the periphery of the cartridge or splashing of the liquid.

Not all of the plurality of components in the aspects of the present disclosure described above are essential, some of the plurality of components described above may be changed, deleted, replaced with new components, and some of restrictions may be deleted as appropriate to achieve to solve some or all of the problems described above or achieve some or all of the effects described above. In addition, to solve some or all of the problems described above or achieve some or all of the effects described in this specification, some or all of the technical features included in one aspect of the present disclosure may be combined with some or all of the technical features included in another aspect of the present disclosure to form an independent one aspect.

The present disclosure may also be achieved in various aspects other than the liquid holding member, the cartridge, and the printing device. For example, the present disclosure may be achieved in forms of manufacturing methods of the liquid holding member, the cartridge, and the printing device.

What is claimed is:

1. A liquid holding member comprising:
a bottom surface;
a plurality of convex portions projecting from the bottom surface, each of the convex portions including a plurality of surfaces;
a plurality of first edge portions formed by the bottom surface and the surfaces of the convex portions with ridge lines present therebetween; and
a plurality of second edge portions formed by adjacent surfaces of the convex portions with ridge lines present therebetween.

2. The liquid holding member according to claim 1,
wherein an angle formed by at least one of the first edge portions and an angle formed by at least one of the second edge portions are 90 degrees or less.

3. The liquid holding member according to claim 1,
wherein, when a direction in which the convex portions project orthogonally to the bottom surface is a first direction and two directions that are orthogonal to the first direction and are orthogonal to each other are a second direction and a third direction, the ridge lines of the first edge portions and the ridge lines of the second edge portions include different components among a component in the first direction, a component in the second direction, and a component in the third direction.

4. The liquid holding member according to claim 1,
wherein an angle formed by at least one of the second edge portions is smaller than angles formed by the first edge portions.

5. A liquid holding member comprising:
a bottom surface; and
a plurality of convex portions projecting from the bottom surface, each of the convex portions including a plurality of surfaces,
wherein, when a direction in which the convex portions project orthogonally to the bottom surface is a first direction and two directions that are orthogonal to the first direction and are orthogonal to each other are a second direction and a third direction, a plurality of convex portion sets each including two or more different convex portions of the convex portions are arranged in at least one of the second direction and the third direction.

6. A cap to be detachably attached to a cartridge having a liquid supply portion, the cap comprising:
a facing surface that faces the liquid supply portion; and
a liquid holding member disposed on the facing surface, the liquid holding member comprising:
a bottom surface; and
a plurality of convex portions projecting from the bottom surface, each of the convex portions including a plurality of surfaces;
wherein the plurality of convex portions are molded integrally with the bottom surface.

7. The cap according to claim 6,
wherein the liquid supply portion has a discharge opening portion through which a liquid stored in the cartridge is discharged to an outside, and
the liquid holding member is formed in a position on the facing surface, the position facing the discharge opening portion.

8. A cartridge comprising:
a liquid supply portion having a central axis;
a cartridge bottom surface; and
a cap according to claim 6,
wherein the cartridge bottom surface has a bottom opening portion through which the liquid supply portion is exposed, and
the liquid holding member is formed in at least part of a circumference around the central axis in a position on the cartridge bottom surface, the bottom opening portion being surrounded in the position.

* * * * *